US012734849B2

(12) United States Patent
Chou et al.

(10) Patent No.: US 12,734,849 B2
(45) Date of Patent: Sep. 15, 2026

(54) VEHICLE-MOUNTED AIR COMPRESSOR AND BOTTLE CAP ASSEMBLY

(71) Applicant: UNIK WORLD INDUSTRIAL CO., LTD., Tainan City (TW)

(72) Inventors: Wen San Chou, Tainan City (TW); Cheng Hsien Chou, Tainan City (TW)

(73) Assignee: UNIK WORLD INDUSTRIAL CO., LTD., Tainan City (TW)

( * ) Notice: Subject to any disclaimer, the term of this patent is extended or adjusted under 35 U.S.C. 154(b) by 360 days.

(21) Appl. No.: 18/420,762

(22) Filed: Jan. 24, 2024

(65) Prior Publication Data

US 2025/0128551 A1 Apr. 24, 2025

Related U.S. Application Data

(60) Provisional application No. 63/594,033, filed on Oct. 30, 2023, provisional application No. 63/592,553, filed on Oct. 23, 2023.

(30) Foreign Application Priority Data

Dec. 18, 2023 (TW) ................................ 112149220

(51) Int. Cl.

*B60C 23/10* (2006.01)
*B29C 73/16* (2006.01)
*B60S 5/04* (2006.01)

(52) U.S. Cl.

CPC ............ *B60C 23/10* (2013.01); *B29C 73/166* (2013.01); *B60S 5/04* (2013.01)

(58) Field of Classification Search

CPC .............................. B60C 23/10; B29C 73/166
See application file for complete search history.

(56) References Cited

U.S. PATENT DOCUMENTS 8,596,310 B2 * 12/2013 Senno .................. B29C 73/166 141/330
9,010,383 B2 * 4/2015 Nakao .................. B29C 73/166 141/38

(Continued)

FOREIGN PATENT DOCUMENTS

DE 102013114853 6/2015
DE 102019217775 5/2021

(Continued)

OTHER PUBLICATIONS

"Office Action of Taiwan Counterpart Application", issued on Sep. 12, 2024, p. 1-p. 12.

*Primary Examiner* — Timothy L Maust
(74) *Attorney, Agent, or Firm* — JCIPRNET

(57) ABSTRACT

A vehicle-mounted air compressor includes an air compressor main body and a bottle cap assembly. The bottle cap assembly includes a bottle cap component and at least one fastening component. The bottle cap component is installed on the air compressor main body and has an air inlet end and an air outlet end connected to each other, and the bottle cap component is inserted to the air compressor main body through the air inlet end along an inserting direction. An air flow from the air compressor main body is adapted to pass through the air inlet end and the air outlet end in sequence. The fastening component fastens the bottle cap component to the air compressor main body along a fastening direction. The fastening direction is the same as the inserting direction.

18 Claims, 41 Drawing Sheets

(56) References Cited

U.S. PATENT DOCUMENTS

| | | | | |
|---|---|---|---|---|
| 9,873,232 | B2 * | 1/2018 | Eckhardt | B60S 5/04 |
| 10,029,429 | B2 * | 7/2018 | Eckhardt | F16K 15/20 |

FOREIGN PATENT DOCUMENTS

| | | | | |
|---|---|---|---|---|
| DE | 202022103299 | | 7/2022 | |
| EP | 2918834 | | 9/2015 | |
| JP | 2007062093 | * | 3/2007 | B29C 73/02 |
| JP | 2010234795 | | 10/2010 | |
| JP | 2011098460 | | 5/2011 | |
| JP | 2011126185 | | 6/2011 | |
| JP | 2016013656 | | 1/2016 | |
| JP | 2018527511 | | 9/2018 | |
| JP | 3242586 | | 6/2023 | |
| KR | 970049577 | | 8/1997 | |
| KR | 20140005870 | | 1/2014 | |
| KR | 20160126869 | | 11/2016 | |
| TW | 201637903 | | 11/2016 | |
| TW | I813367 | | 8/2023 | |
| TW | M656951 | | 6/2024 | |
| WO | 2016030011 | | 3/2016 | |

* cited by examiner 150
130
160
120
110
122
H1
E
H2

122'
122a'
1221'
170
116'
110'
112'

VEHICLE-MOUNTED AIR COMPRESSOR AND BOTTLE CAP ASSEMBLY

CROSS-REFERENCE TO RELATED APPLICATION

This application claims the priority benefit of U.S. provisional application No. 63/592,553, filed on Oct. 23, 2023, U.S. provisional application No. 63/594,033, filed on Oct. 30, 2023, and Taiwan application no. 112149220, filed on Dec. 18, 2023. The entirety of each of the above-mentioned patent applications is hereby incorporated by reference herein and made a part of this specification.

BACKGROUND

Technical Field

The invention relates to an air compressor, and further relates to a vehicle-mounted air compressor.

Description of Related Art

A vehicle-mounted air compressor can be used with a tire sealant bottle to repair and inflate a tire of a vehicle, and can also be used to inflate the tire of the vehicle without the tire sealant bottle. Generally, when performing tire repair and inflation operations, a bottle cap assembly needs to be installed on an air compressor main body of the vehicle-mounted air compressor, such that the air compressor main body can be combined with the tire sealant bottle and an high-pressure airflow from the air compressor body can pass through the bottle cap assembly and enter the tire sealant bottle, and then the high-pressure air flow drives the tire sealant in the tire sealant bottle into the tire to perform tire repair and inflation operations.

Limited by the configuration space on the air compressor body and other factors, the arrangement position and fastening direction of the fastening structure between the air compressor main body and the bottle cap assembly are usually not user-friendly, making it difficult for the user to easily install the bottle cap assembly on the air compressor main body.

SUMMARY

The invention provides a vehicle-mounted air compressor and a bottle cap assembly thereof, wherein the bottle cap assembly can be easily assembled to a air compressor main body.

The vehicle-mounted air compressor of the invention includes an air compressor main body and a bottle cap assembly. The bottle cap assembly includes a bottle cap component and at least one fastening component. The bottle cap component is installed on the air compressor main body and has an air inlet end and an air outlet end connected to each other, and the bottle cap component is inserted to the air compressor main body through the air inlet end along an inserting direction. An air flow from the air compressor main body is adapted to pass through the air inlet end and the air outlet end in sequence. The fastening component fastens the bottle cap component to the air compressor main body along a fastening direction. The fastening direction is the same as the inserting direction.

The bottle cap assembly of the invention is adapted to a vehicle-mounted air compressor and includes a bottle cap component and at least one fastening component. The bottle cap component is installed on an air compressor main body of the vehicle-mounted air compressor and has an air inlet end and an air outlet end connected to each other, and the bottle cap component is inserted to the air compressor main body through the air inlet end along an inserting direction. An air flow from the air compressor main body is adapted to pass through the air inlet end and the air outlet end in sequence. The fastening component fastens the bottle cap component to the air compressor main body along a fastening direction. The fastening direction is the same as the inserting direction.

In an embodiment of the invention, the bottle cap component has at least one assembling hole, and the at least one fastening component passes through the at least one assembling hole and is locked to the air compressor main body.

In an embodiment of the invention, the at least one assembling hole comprises two assembling holes, the two assembling holes are arranged along an arrangement direction to be located at two opposite sides of the bottle cap component respectively, and the arrangement direction is perpendicular to the fastening direction.

In an embodiment of the invention, the bottle cap component is adapted to be coupled with a tire sealant containing bottle along a coupling direction, and the arrangement direction is perpendicular to the coupling direction.

In an embodiment of the invention, the bottle cap component has at least one ear portion, and the at least one assembling hole is located on the at least one ear portion.

In an embodiment of the invention, the bottle cap component is adapted to be coupled with a bottle mouth of a tire sealant containing bottle, the bottle cap component has at least one cutting rib, and the at least one cutting rib is adapted to cut a sealing film on the bottle mouth of the tire sealant containing bottle.

In an embodiment of the invention, an air inlet direction of the air inlet end and an air outlet direction of the air outlet end are perpendicular to each other.

In an embodiment of the invention, an air inlet direction of the air inlet end and an air outlet direction of the air outlet end are parallel to each other.

In an embodiment of the invention, the air compressor main body has an accommodating concave portion and at least one locking hole, the bottle cap component is accommodated in the accommodating concave portion, the at least one locking hole is located in the accommodating concave portion, and the at least one fastening component is locked to the at least one locking hole.

In an embodiment of the invention, the accommodating concave portion has at least one inner wall perpendicular to the fastening direction, and the at least one locking hole is located on the at least one inner wall.

In an embodiment of the invention, the accommodating concave portion has an opening end, and a locking tool is adapted to reach the at least one locking hole through the opening end and locks the at least one fastening component to the at least one locking hole.

In an embodiment of the invention, the air compressor main body has an air outlet pipe, the air outlet pipe is connected to the air inlet end of the bottle cap component, a top surface of the air compressor main body has an opening, and an interconnection between the air outlet pipe and the air inlet end of the bottle cap component is corresponding to the opening.

Based on the above, the vehicle-mounted air compressor of the invention fastens the bottle cap component to the air compressor main body by the fastening components, the user only needs to simply install the bottle cap component to the air compressor main body and lock the fastening components for installing the bottle cap component, and the user only needs to simply remove the fastening components and then remove the bottle cap component for completing the disassembly of the bottle cap component and/or the replacement of the tire sealant containing bottle. Furthermore, by setting the fastening direction of the fastening components to be the same as the inserting direction of the air inlet end of the bottle cap component, the invention allows the user to sequentially install the bottle cap component and fasten the fastening components in a convenient and identical working direction. In addition, since the fastening direction of the fastening components is the same as the inserting direction of the air inlet end of the bottle cap component, the air inlet end can be firmly inserted to the air compressor main body by fastening the fastening components.

To make the aforementioned more comprehensible, several embodiments accompanied with drawings are described in detail as follows.

BRIEF DESCRIPTION OF THE DRAWINGS

The accompanying drawings are included to provide a further understanding of the disclosure, and are incorporated in and constitute a part of this specification. The drawings illustrate exemplary embodiments of the disclosure and, together with the description, serve to explain the principles of the disclosure.

DESCRIPTION OF THE EMBODIMENTS

Figure 1:
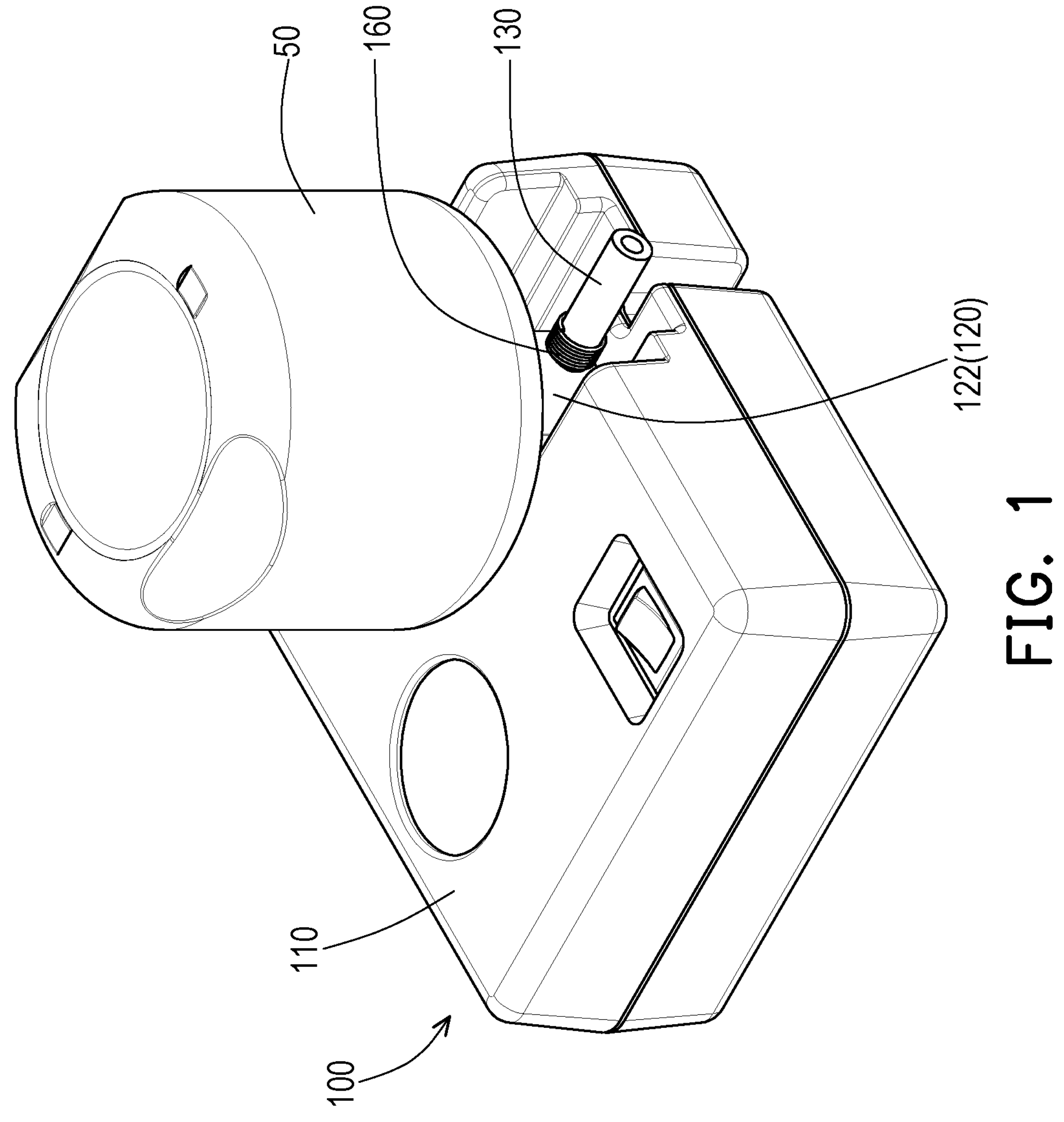
FIG. 1 is a three-dimensional view of a vehicle-mounted air compressor and a tire sealant containing bottle according to an embodiment of the invention.
Figure 2:
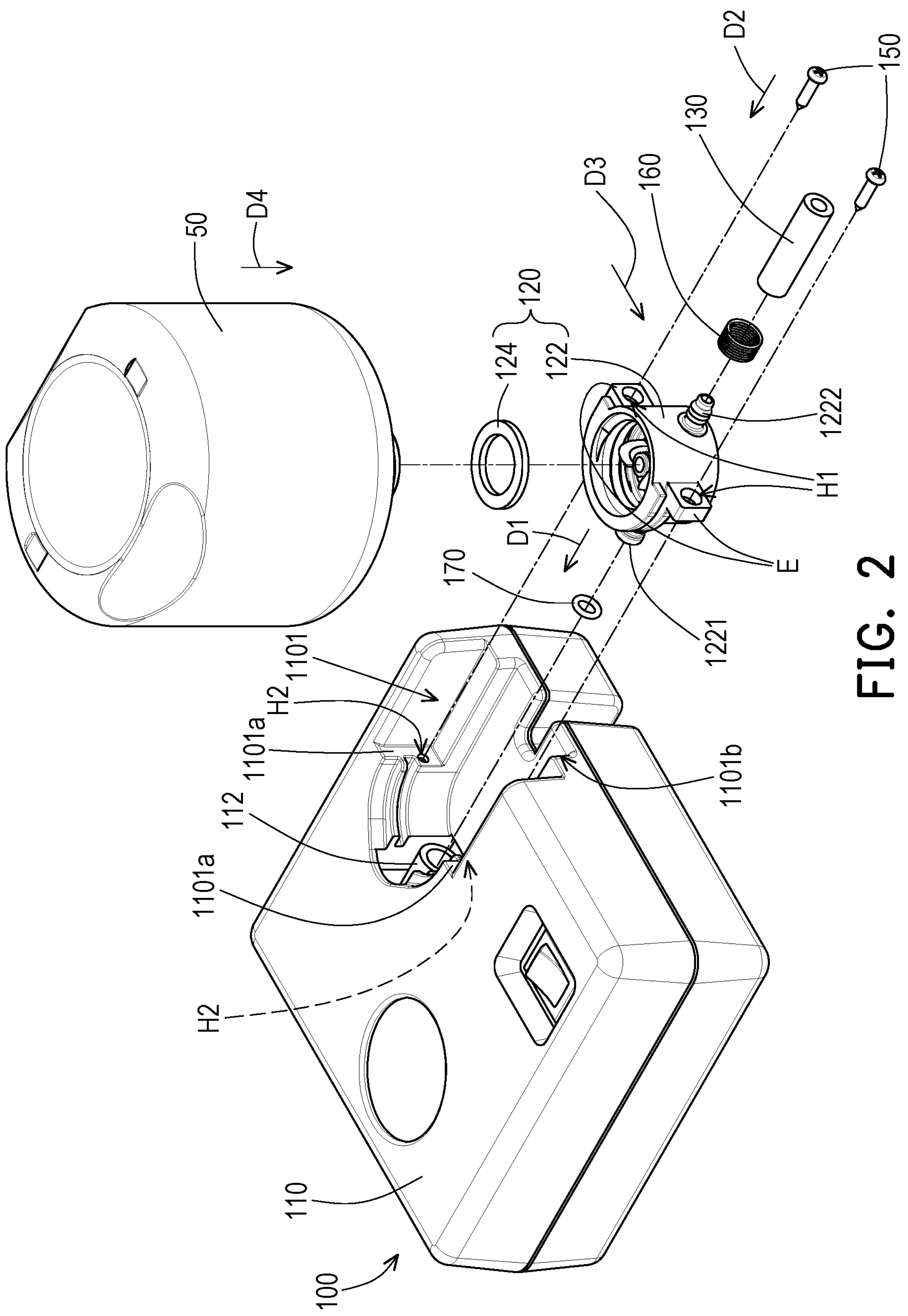
FIG. 2 is an exploded view of the vehicle-mounted air compressor and the tire sealant containing bottle in FIG. 1.
Figure 3:
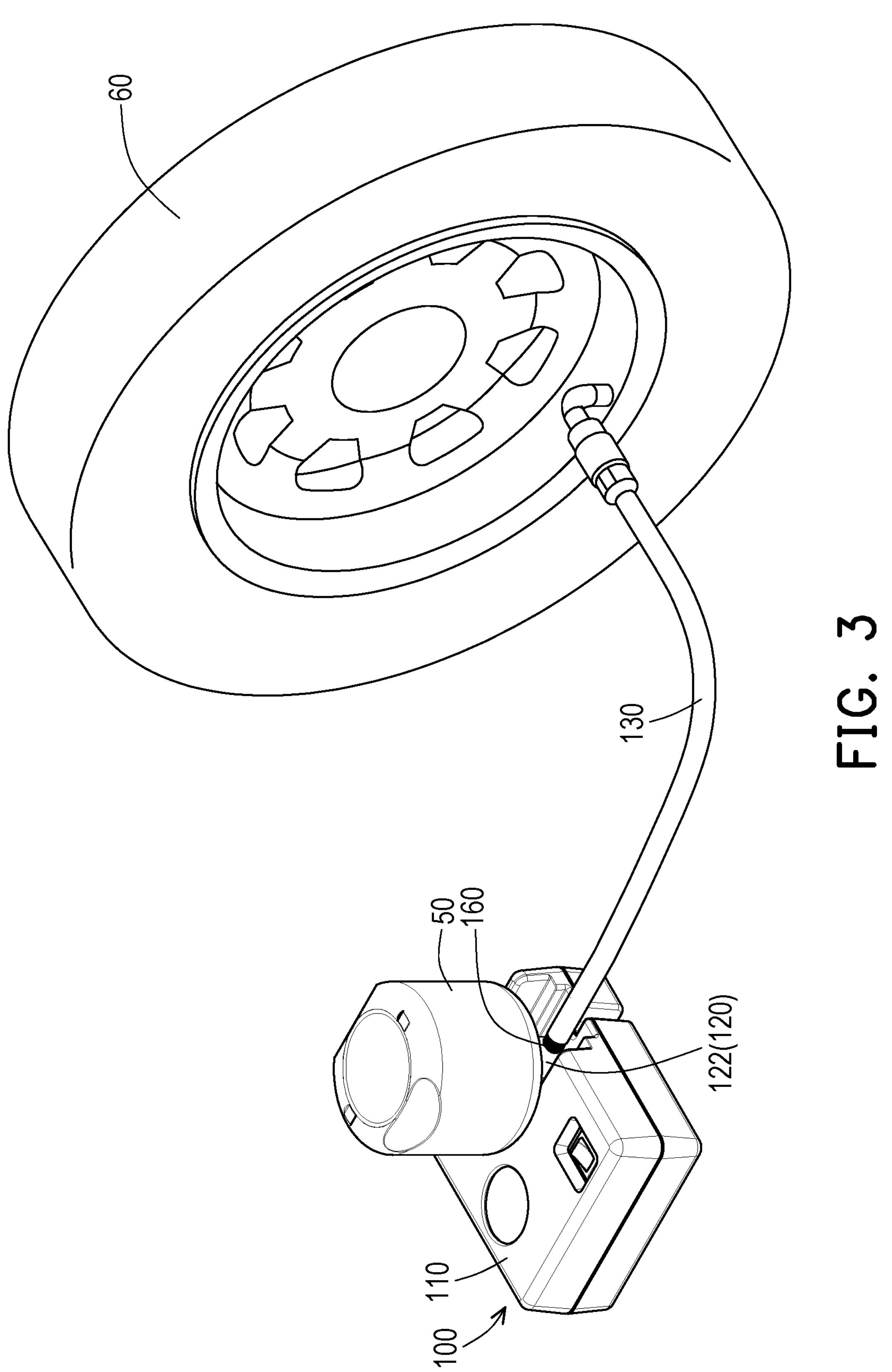
FIG. 3 is a three-dimensional view of the vehicle-mounted air compressor in FIG. 1 connecting to a tire.

FIG. 1 is a three-dimensional view of a vehicle-mounted air compressor and a tire sealant containing bottle according to an embodiment of the invention. FIG. 2 is an exploded view of the vehicle-mounted air compressor and the tire sealant containing bottle in FIG. 1. FIG. 3 is a three-dimensional view of the vehicle-mounted air compressor in FIG. 1 connecting to a tire. Referring to FIG. 1 to FIG. 3, the vehicle-mounted air compressor 100 of the embodiment includes an air compressor main body 110, a bottle cap assembly 120 and an connection pipe 130. The bottle cap assembly 120 includes a bottle cap component 122 and a sealing component 124. The bottle cap component 122 is installed on the air compressor main body 110 and has an air inlet end 1221 and an air outlet end 1222 connected to each other. The air inlet end 1221 and the air outlet end 1222 are, for example, columns protruding from an outer surface of the bottle cap component 122, and an air inlet direction of the air inlet end 1221 and an air outlet direction of the air outlet end 1222 are, for example, parallel to each other. The air inlet end 1221 is adapted to be inserted to an air outlet pipe 112 of the air compressor main body 110 along an inserting direction D1 (illustrated in FIG. 2). The sealing component 124 is made by, for example, rubber, silicone or other types of elastic sealing material and is disposed on the bottle cap component 122. The tire sealant containing bottle 50 is configured to be coupled to the bottle cap component 122 along a coupling direction D4 (illustrated in FIG. 2). The bottle cap component 122 can be connected to a tire 60 through the connection pipe 130.

A high-pressure air flow from the air compressor main body 110 is adapted to enter the bottle cap component 122 through the air inlet end 1221 of the bottle cap component 122, and then reaches the tire sealant containing bottle 50 through the bottle cap component 122, such that a tire sealant in the tire sealant containing bottle 50 is driven to pass through the bottle cap component 122, leave the bottle cap component 122 through the air outlet end 1222 of the bottle cap component 122 and flow toward the tire 60 through the connection pipe 130 by the high-pressure air flow, so as to perform tire repair and inflation operations. The method and principle of the air compressor main body 110 generating the high-pressure air flow are known in the technical field and will not be described in detail here.

The air compressor main body 110 of the embodiment further includes at least one fastening component 150 (illustrated as two). The fastening component 150 fastens the bottle cap component 122 to the air compressor main body 110 along a fastening direction D2 (illustrated in FIG. 2). The fastening direction D2 is the same as the inserting direction D1.

As described above, the vehicle-mounted air compressor 100 of the embodiment fastens the bottle cap component 122 to the air compressor main body 110 by the fastening components 150, the user only needs to simply install the bottle cap component 122 to the air compressor main body 110 and lock the fastening components 150 for installing the bottle cap component 122, and the user only needs to simply remove the fastening components 150 and then remove the bottle cap component 122 for completing the disassembly of the bottle cap component 122 and/or the replacement of the tire sealant containing bottle 50. Furthermore, by setting the fastening direction D2 of the fastening components 150 to be the same as the inserting direction D1 of the air inlet end 1221 of the bottle cap component 122, and setting the fastening position of the fastening components 150 and the inserting position of the air inlet end 1221 of the bottle cap component 122 at the same side of the air compressor main body 110 (upper side of the air compressor main body 110), the embodiment allows the user to sequentially install the bottle cap component 122 and fasten the fastening components 150 in a convenient and identical working direction. In addition, since the fastening direction of the fastening components 150 is the same as the inserting direction of the air inlet end 1221 of the bottle cap component 122, the air inlet end 1221 can be firmly inserted to the air compressor main body 110 by fastening the fastening components 150.

Figure 4:
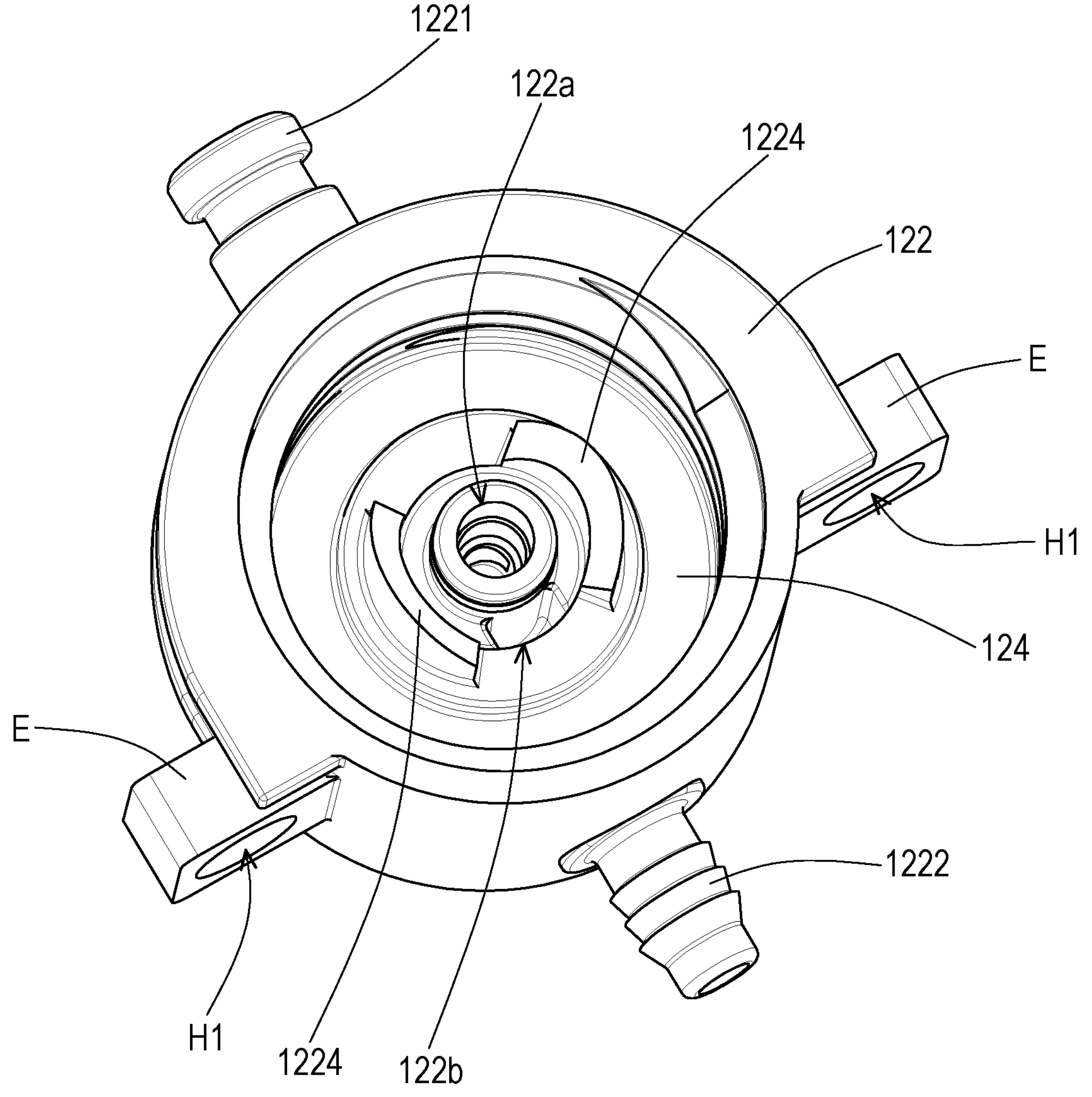
FIG. 4 is a three-dimensional view of the bottle cap component in FIG. 1.

FIG. 4 is a three-dimensional view of the bottle cap component in FIG. 1. Referring to FIG. 2 and FIG. 4, in detail, the bottle cap component 122 of the embodiment has two ear portions E and two assembling holes H1 on the two ear portions E respectively. The two fastening components 150 are, for example, screws, which pass through the two assembling holes H1 respectively and are locked to the air compressor main body 110. Furthermore, the two assembling holes H1 are arranged along an arrangement direction D3 (illustrated in FIG. 2) perpendicular to the fastening direction D2 and the coupling direction D4 to be located at opposite two sides of the bottle cap component 122 respectively, such that the fastening components 150 can fasten the bottle cap component 122 firmly.

Referring to FIG. 2, in the embodiment, the air compressor main body 110 has an accommodating concave portion 1101 and two locking holes H2, the accommodating concave portion 1101 has inner walls 1101*a* perpendicular to the fastening direction D2, and the locking holes H2 are on the inner walls 1101*a* to be located in the accommodating concave portion 1101. The bottle cap component 122 is accommodated in the accommodating concave portion 1101, and the two fastening components 150 passing through the two assembling holes H1 are locked to the two locking holes H2 respectively. Furthermore, the accommodating concave portion 1101 has an opening end 1101*b*, and a locking tool (such as a screwdriver) is adapted to reach the locking hole H2 through the opening end 1101*b* and locks the fastening component 150 to the locking hole H2.

Figure 5:
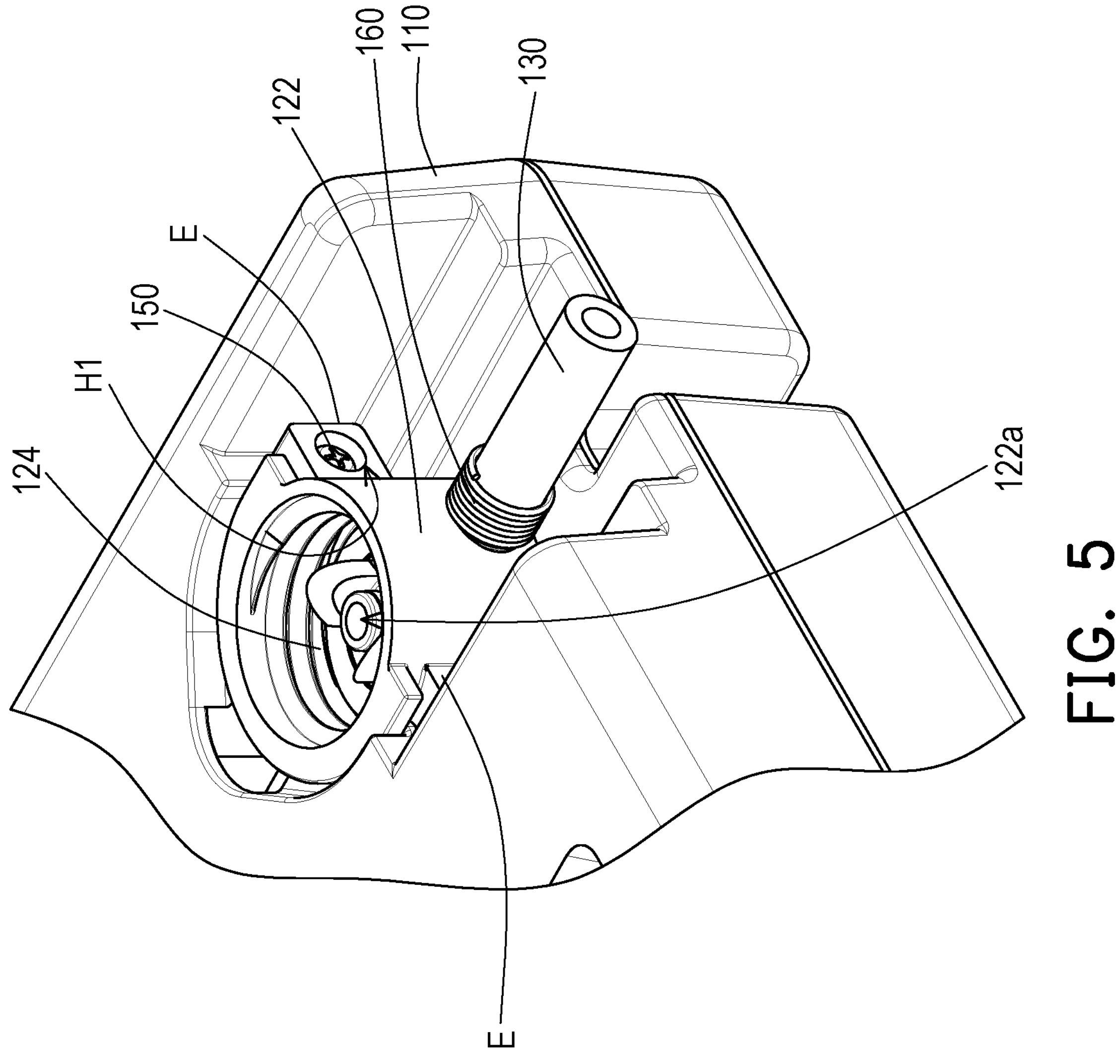
FIG. 5 is a partial three-dimensional view of the vehicle-mounted air compressor in FIG. 1.
Figure 6:
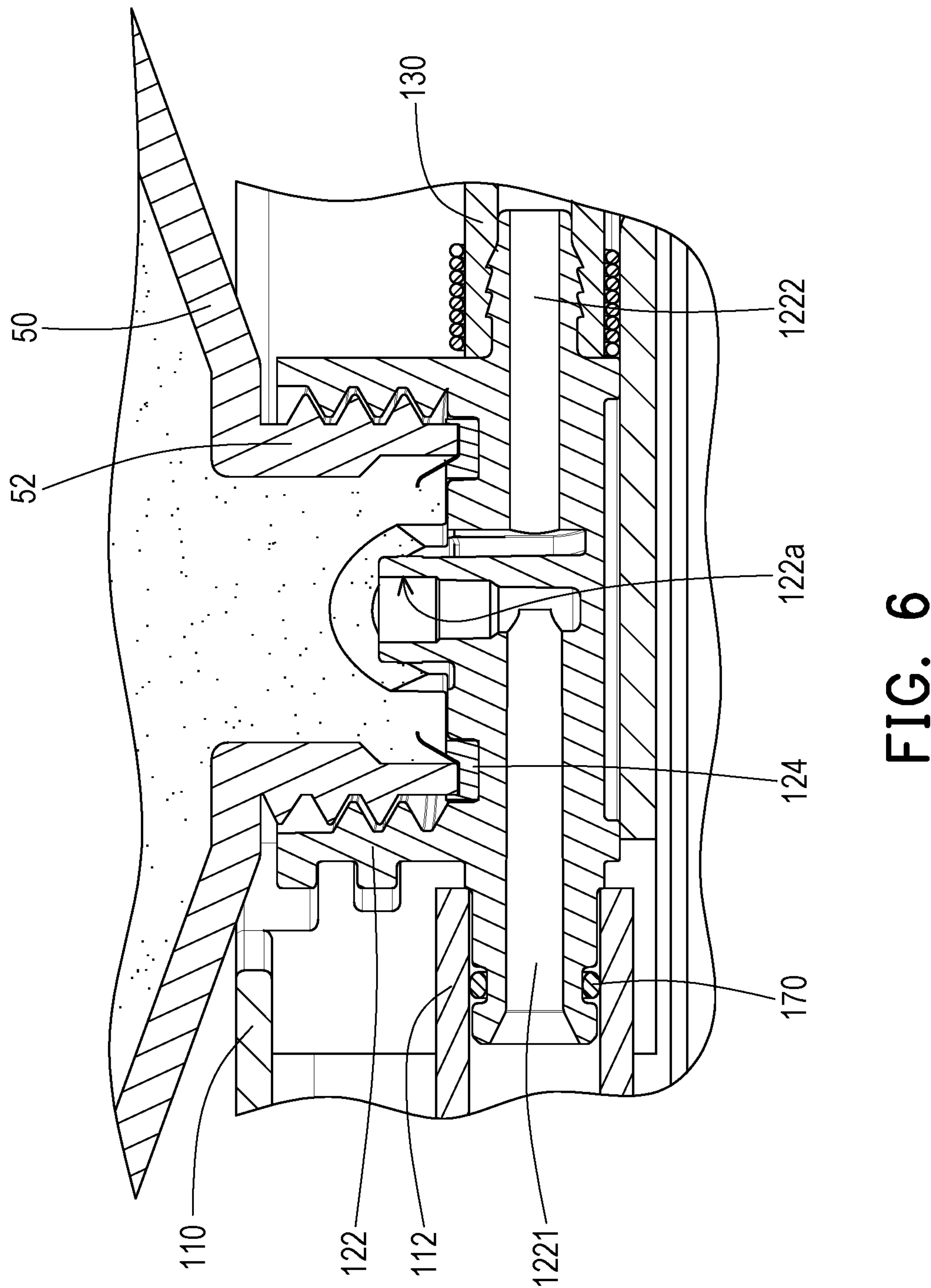
FIG. 6 is a partial cross-sectional view of the vehicle-mounted air compressor and the tire sealant containing bottle in FIG. 1.

FIG. 5 is a partial three-dimensional view of the vehicle-mounted air compressor in FIG. 1. FIG. 6 is a partial cross-sectional view of the vehicle-mounted air compressor and the tire sealant containing bottle in FIG. 1. Referring to FIG. 5 and FIG. 6, the sealing component 124 of the embodiment is in the bottle cap component 122 and surrounds the air inlet opening 122*a*. When the bottle mouth 52 of the tire sealant containing bottle 50 is coupled to the bottle cap component 122, the bottle mouth 52 of the tire sealant containing bottle 50 presses the sealing component 124, such that the sealing component 124 is compressed between the bottle cap component 122 and the bottle mouth 52 of the tire sealant containing bottle 50, so as to prevent the tire sealant in the tire sealant containing bottle 50 from flowing out through a gap between the bottle mouth 52 and the bottle cap component 122.

Figure 7:
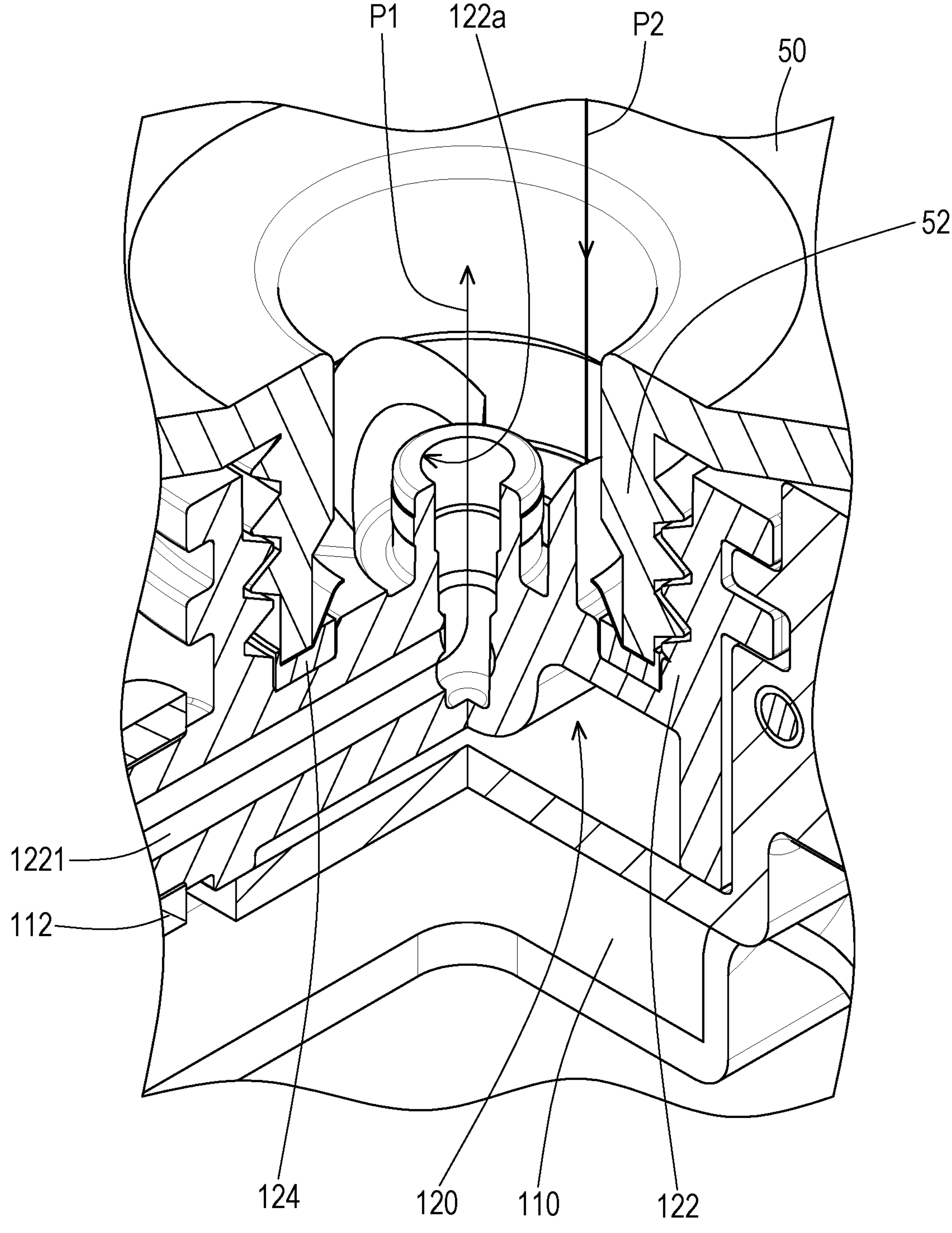
FIG. 7 illustrates partial structures of the vehicle-mounted air compressor and the tire sealant containing bottle in FIG. 1.
Figure 8:
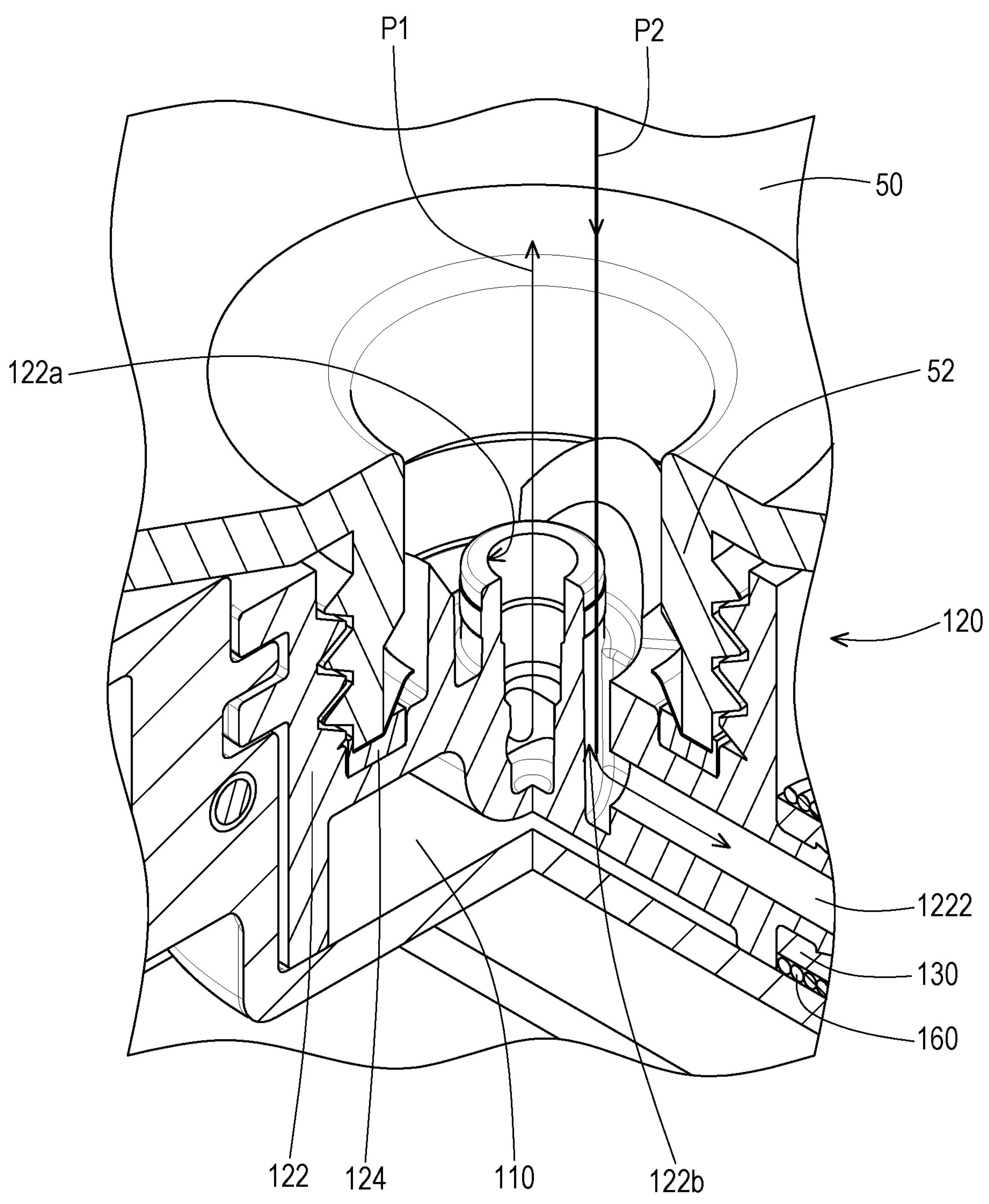
FIG. 8 illustrates partial structures of the vehicle-mounted air compressor and the tire sealant containing bottle in FIG. 1.

FIG. 7 illustrates partial structures of the vehicle-mounted air compressor and the tire sealant containing bottle in FIG. 1. FIG. 8 illustrates partial structures of the vehicle-mounted air compressor and the tire sealant containing bottle in FIG. 1. Referring to FIG. 7 and FIG. 8, specifically, the high-pressure air flow from the air compressor main body 110 (illustrated in FIG. 1) can pass through the air inlet end 1221 and the air inlet opening 122*a* in sequence along the flowing path P1 shown in FIG. 7 to reach inside of the tire sealant containing bottle 50, and the tire sealant in the tire sealant containing bottle 50 can pass through the air outlet opening 122*b* and the air outlet end 1222 along the flowing path P2 shown in FIG. 8 with the high-pressure air flow to flow toward the tire 60 (illustrated in FIG. 3) through the connection pipe 130.

Referring to FIG. 4, in the embodiment, the bottle cap component 122 has two cutting ribs 1224. During the coupling process of the tire sealant containing bottle 50 and the bottle cap component 122, the cutting rib 1224 is adapted to cut the sealing film on the bottle mouth 52 of the tire sealant containing bottle 50, so that the bottle cap component 122 is smoothly connected to the inner space of the tire sealant containing bottle 50.

The following describes the operation flow of the vehicle-mounted air compressor of the embodiment.

Figure 9A:
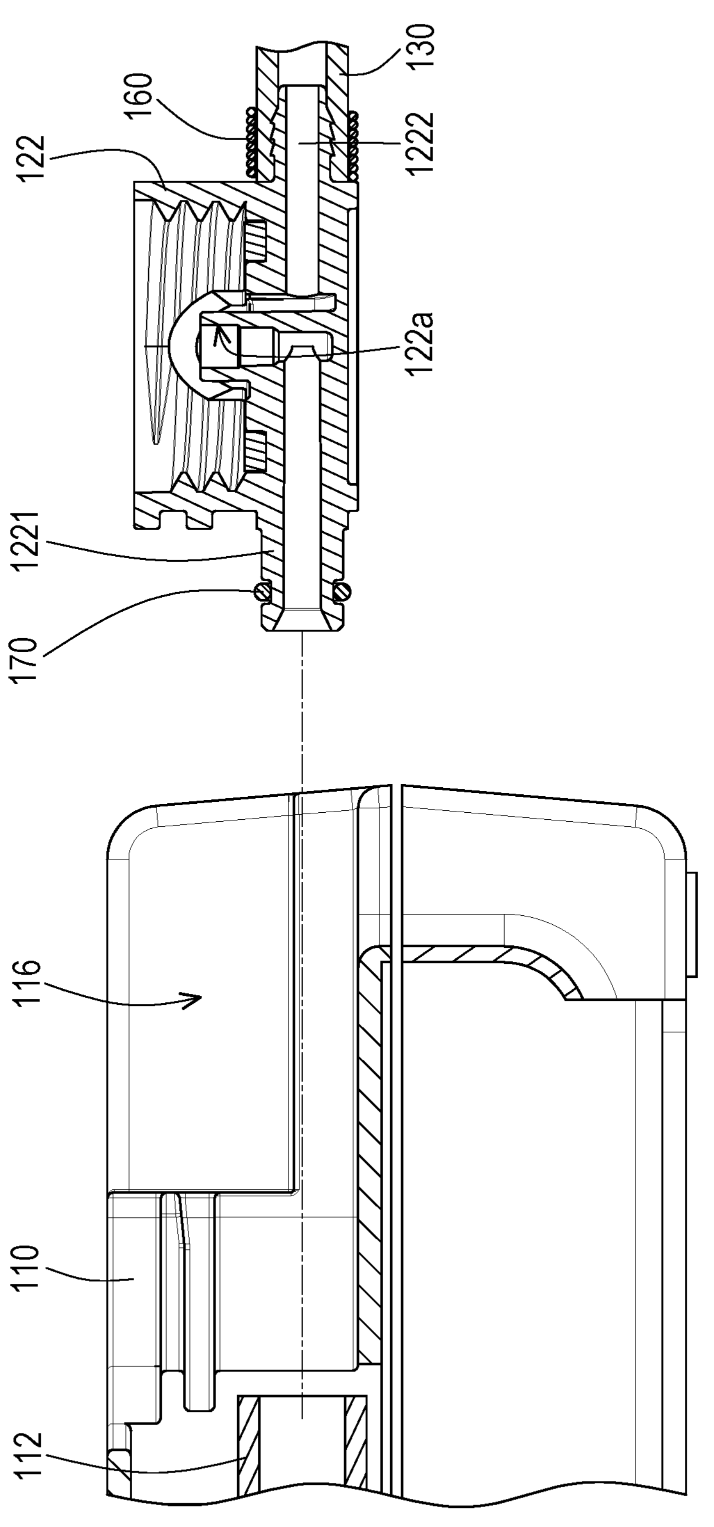
FIG. 9A to FIG. 9E are flowcharts illustrating operation of the vehicle-mounted air compressor in FIG. 1.
Figure 9B:
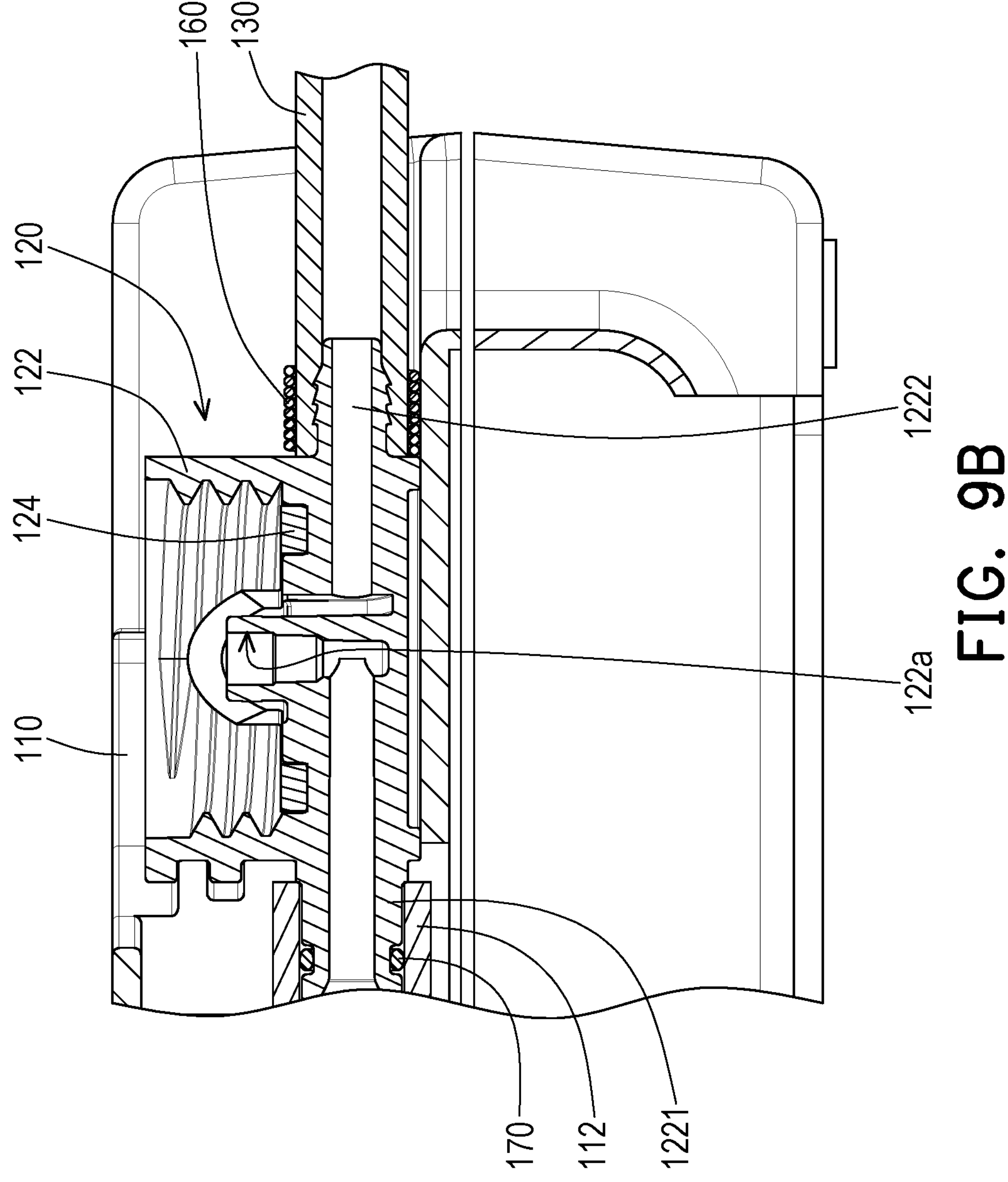

FIG. 9A to FIG. 9B are flowcharts illustrating operation of the vehicle-mounted air compressor in FIG. 1. FIG. 10A to FIG. 10C are top views of the vehicle-mounted air compressor in FIG. 9A to FIG. 9C respectively. First, as shown in FIG. 9A and FIG. 10A, the connection pipe 130 is set on the air outlet end 1222 of the bottle cap component 122, and a pipe clipper 160 is used to fasten the connection pipe 130 to the air outlet end 1222. Then, as shown in FIG. 9B and FIG. 10B, the bottle cap component 122 is installed on the air compressor main body 110 through the guidance of the two guiding surfaces 116 of the air compressor main body 110, and at the same time, the air inlet end 1221 of the bottle cap component 122 is inserted to the air outlet pipe 112 of the air compressor main body 110, so that the air outlet pipe 112 is connected to the air inlet opening 122*a*. The gap between the air inlet end 1221 and the air outlet pipe 112 can be sealed by a sealing ring 170 set on the air inlet end 1221. In addition, the top surface of the air compressor main body 110 has an opening 110*a*, and the interconnection between the air outlet pipe 112 and the bottle cap component 122 is corresponding to the opening 110*a* as shown in FIG. 10B to allow the user to be convenient to visually confirm whether the air outlet pipe 112 and the bottle cap component 122 are indeed connected through the opening 110*a*.

Figure 9C:
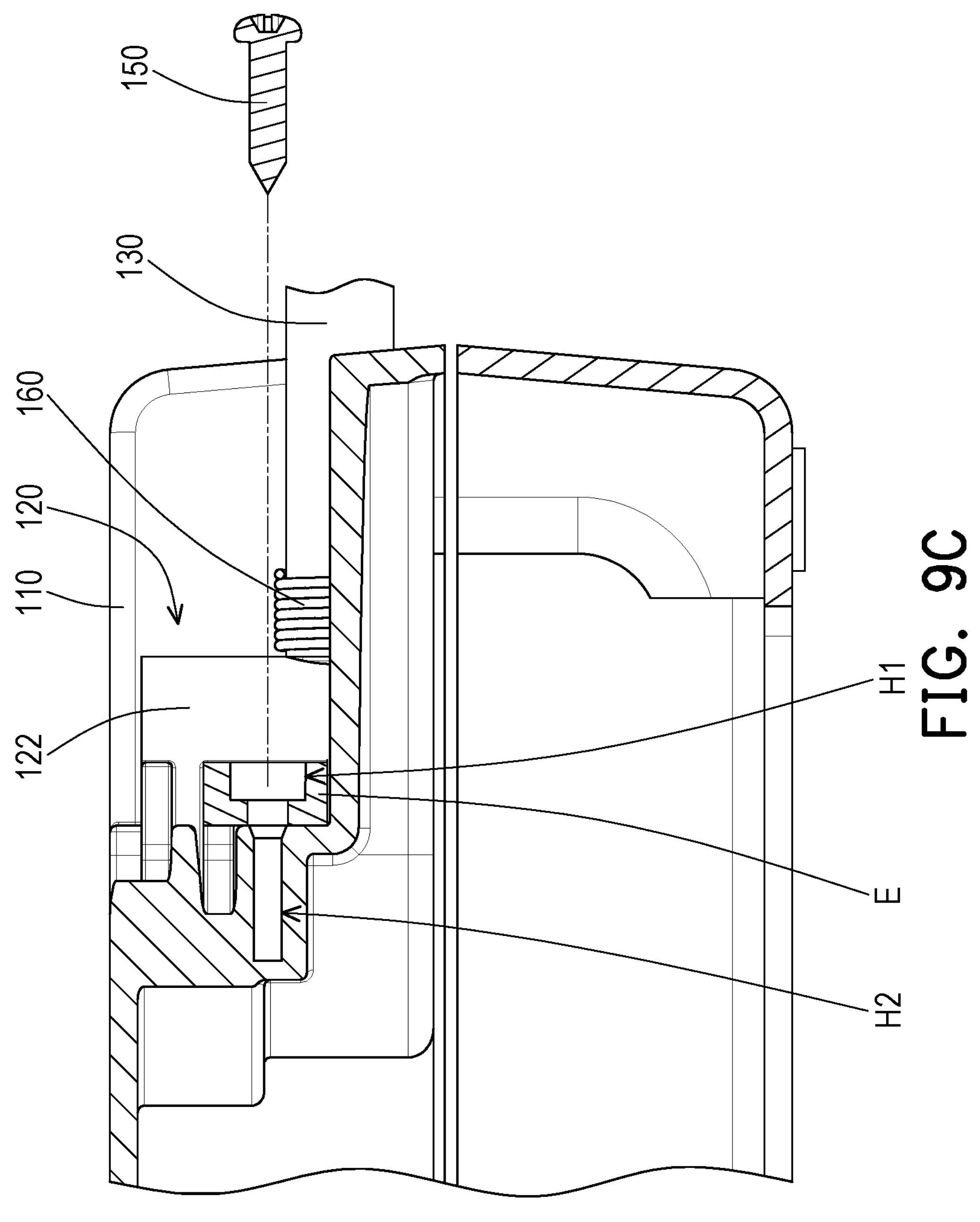
Figure 9D:
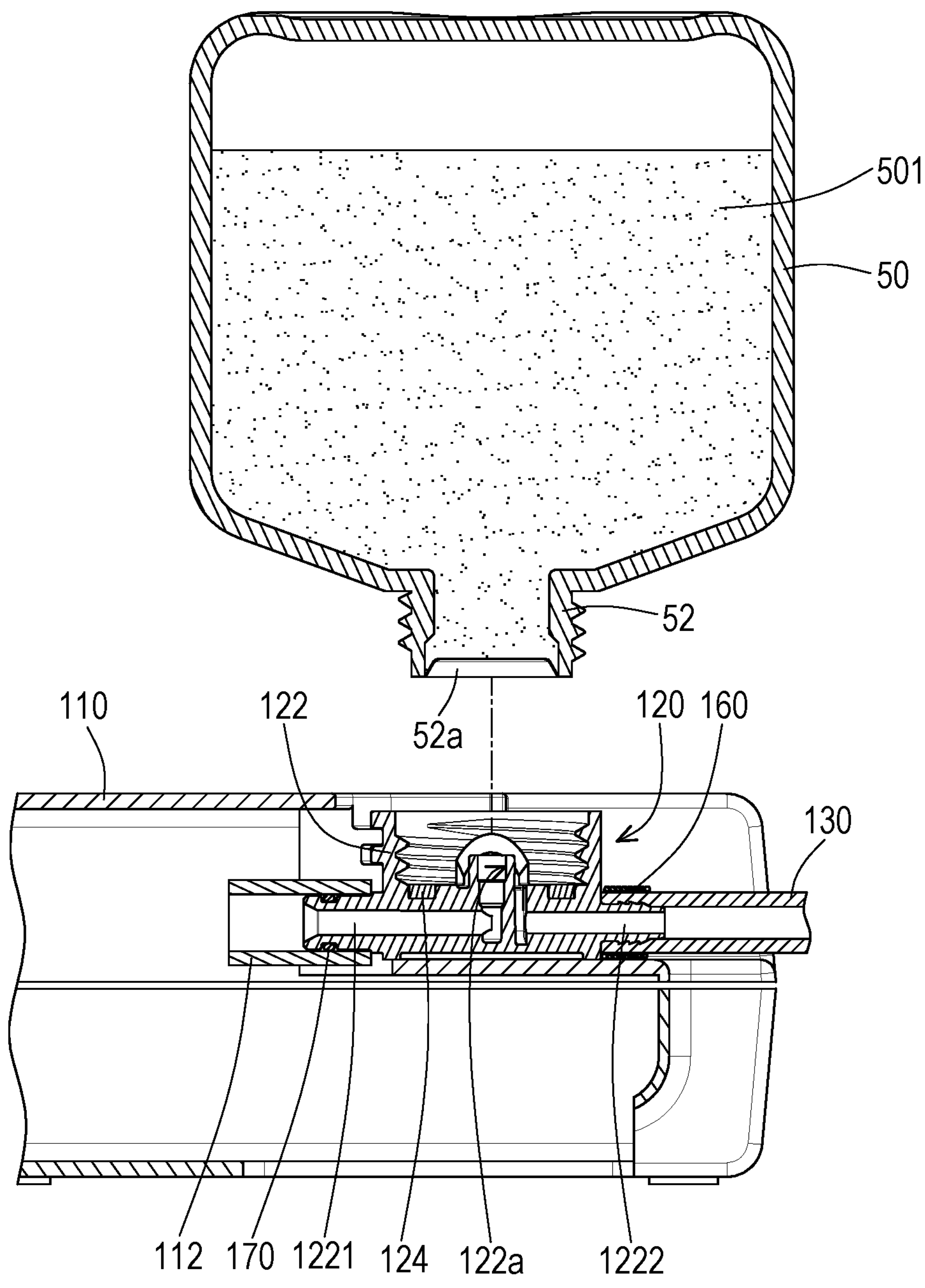
Figure 9E:
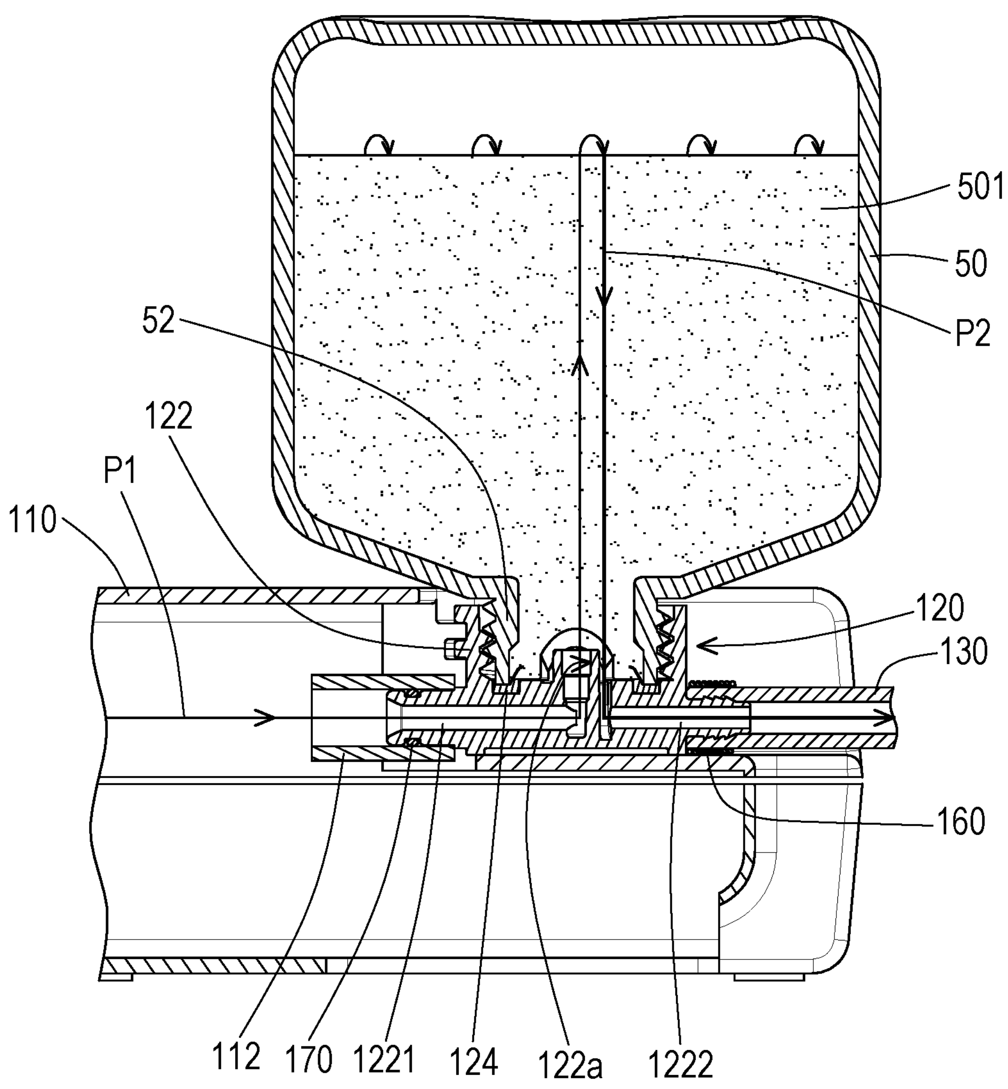
Figure 10A:
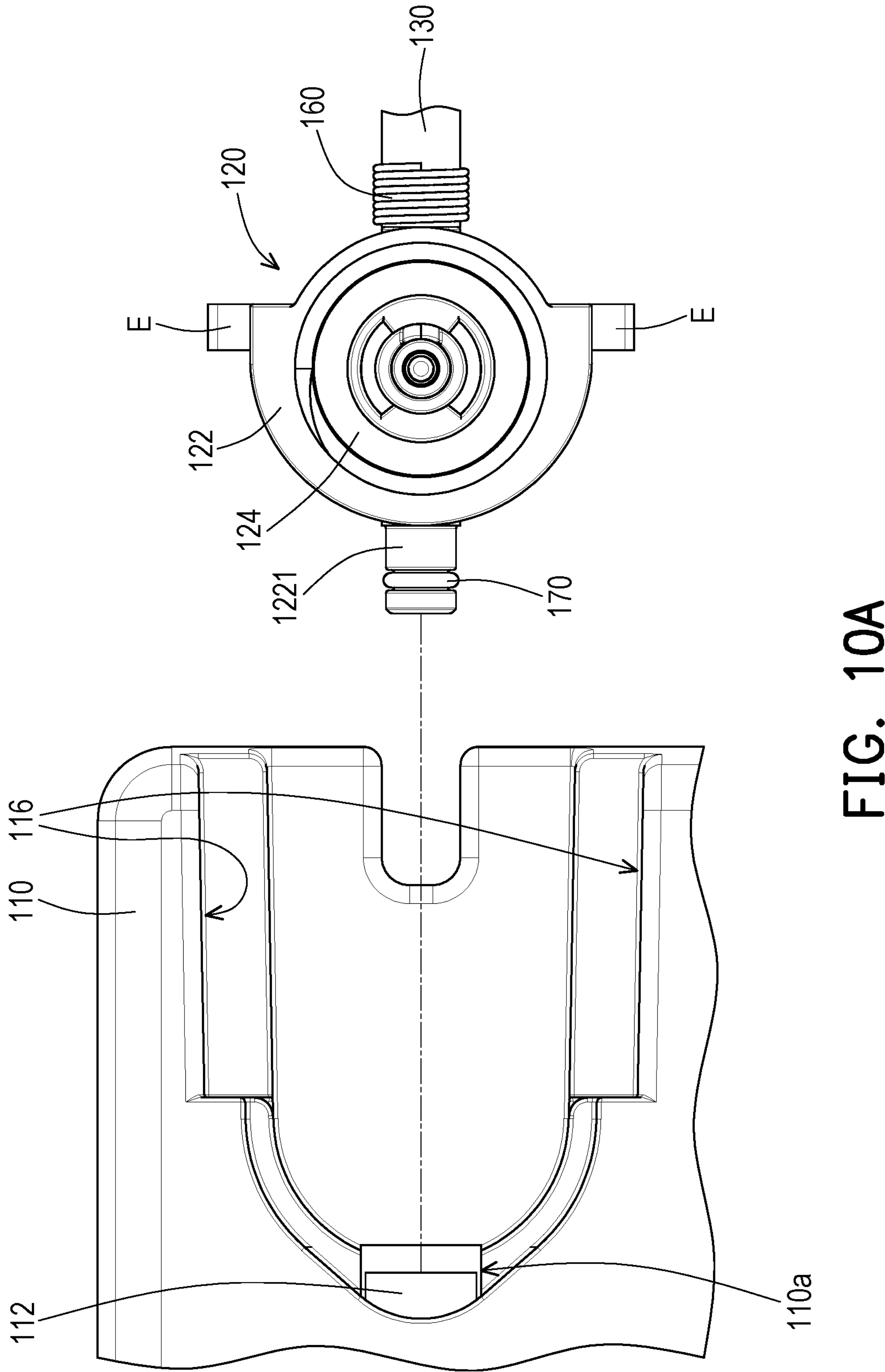
FIG. 10A to FIG. 10C are top views of the vehicle-mounted air compressor in FIG. 9A to FIG. 9C respectively.
Figure 10B:
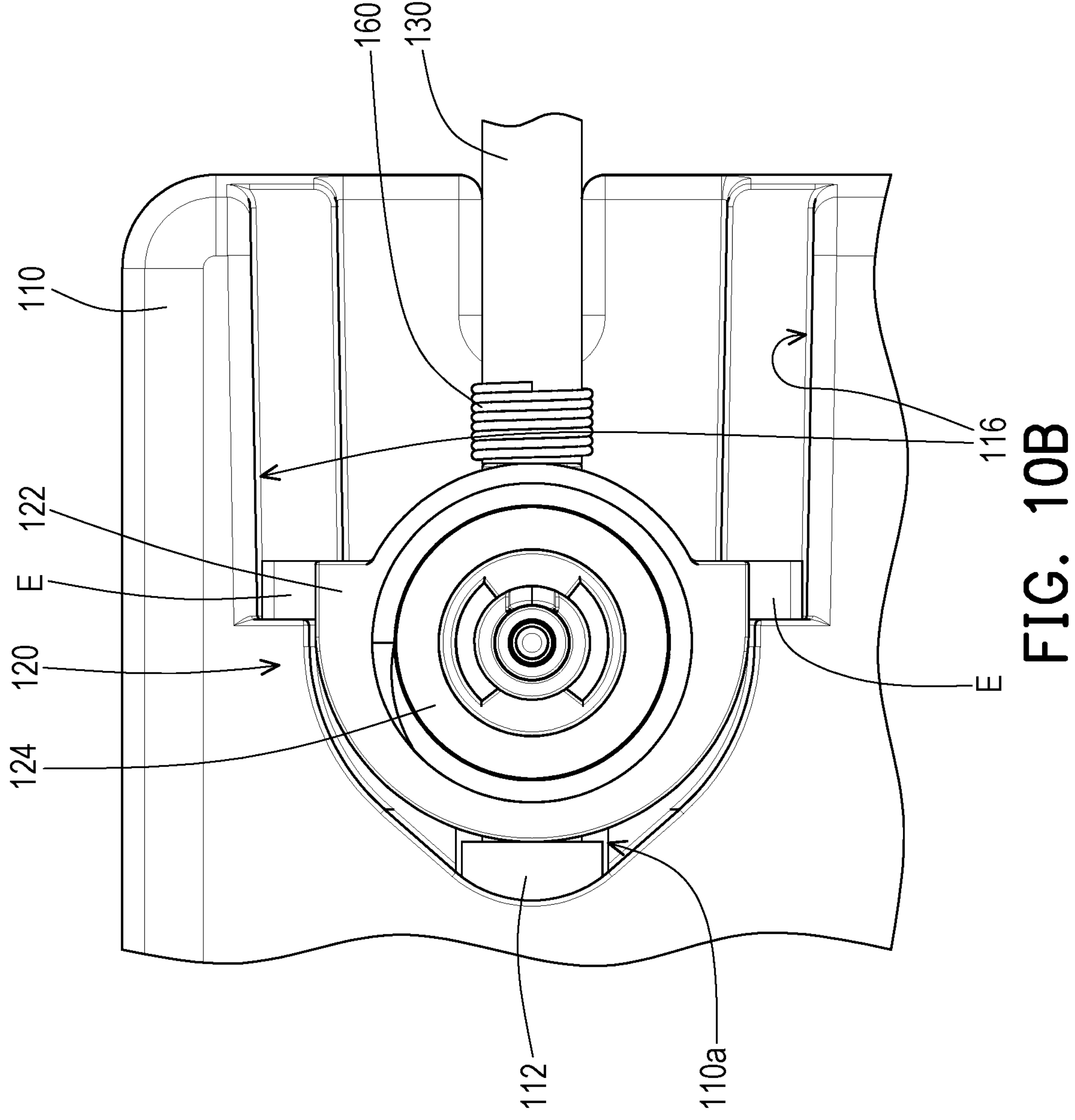
Figure 10C:
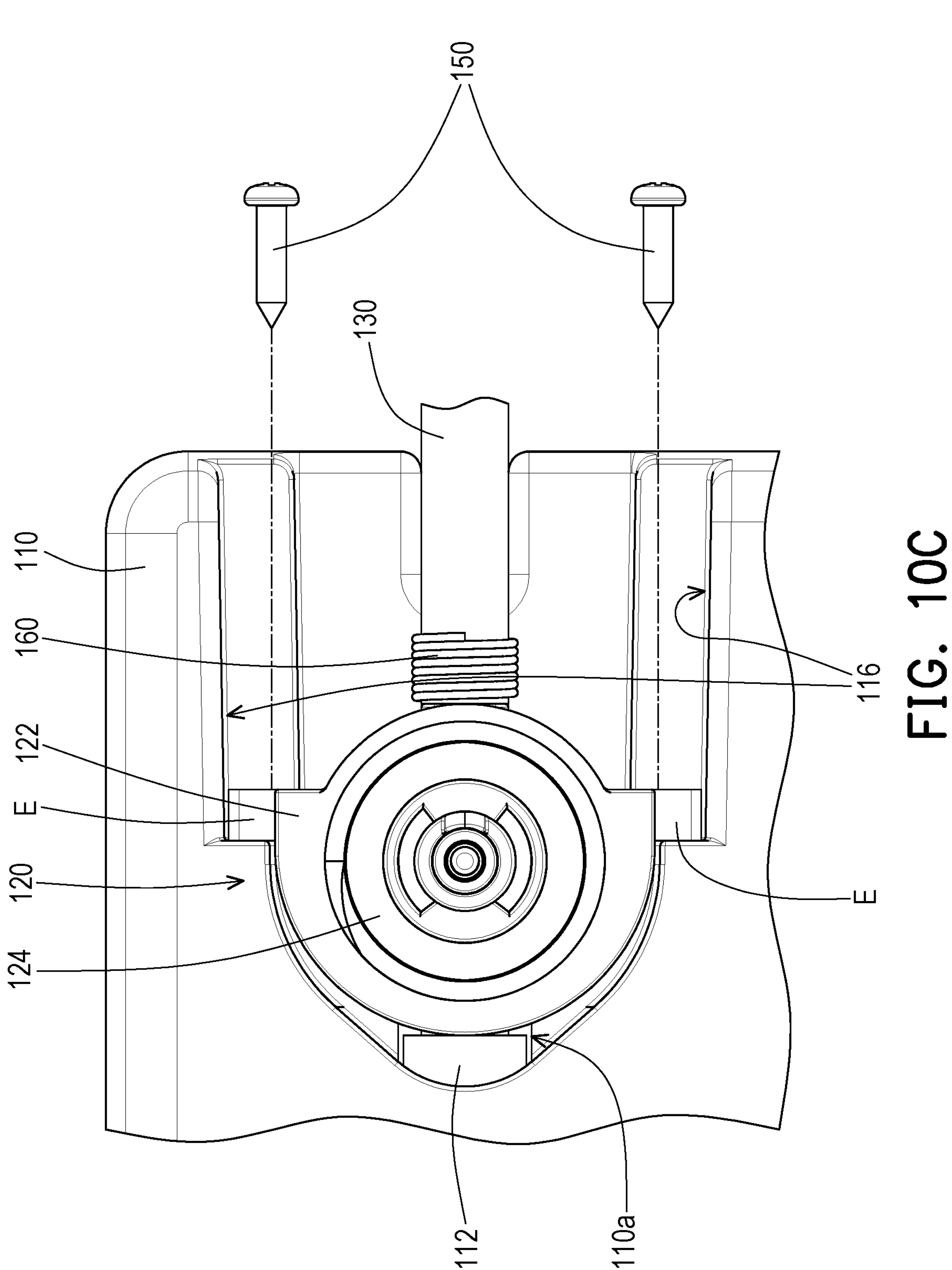

Then, as shown in FIG. 9C and FIG. 10C, the bottle cap component 122 is fastened to the air compressor main body 110 by the fastening components 150 to obtain the state shown in FIG. 9D. Then, as shown in FIG. 9D to FIG. 9E, the bottle mouth 52 of the tire sealant containing bottle 50 is coupled to the bottle cap component 122. During this process, the sealing film 52*a* at the bottle mouth 52 will be cut by the cutting ribs 1224 (illustrated in FIG. 4) of the bottle cap component 122, so that the high-pressure air flow from the air compressor main body 110 can enter the tire sealant containing bottle 50 along the flowing path P1 during subsequent inflation and tire repair operations, and the tire sealant 501 in the tire sealant containing bottle 50 can leave the tire sealant containing bottle 50 along the flowing path P2 with the high-pressure air flow during subsequent inflation and tire repair operations. Finally, the connection pipe 130 is connected to the tire 60 as shown in FIG. 3, and then the inflation and tire repair operations can be performed to the tire 60 by the vehicle-mounted air compressor 100.

Figure 11:
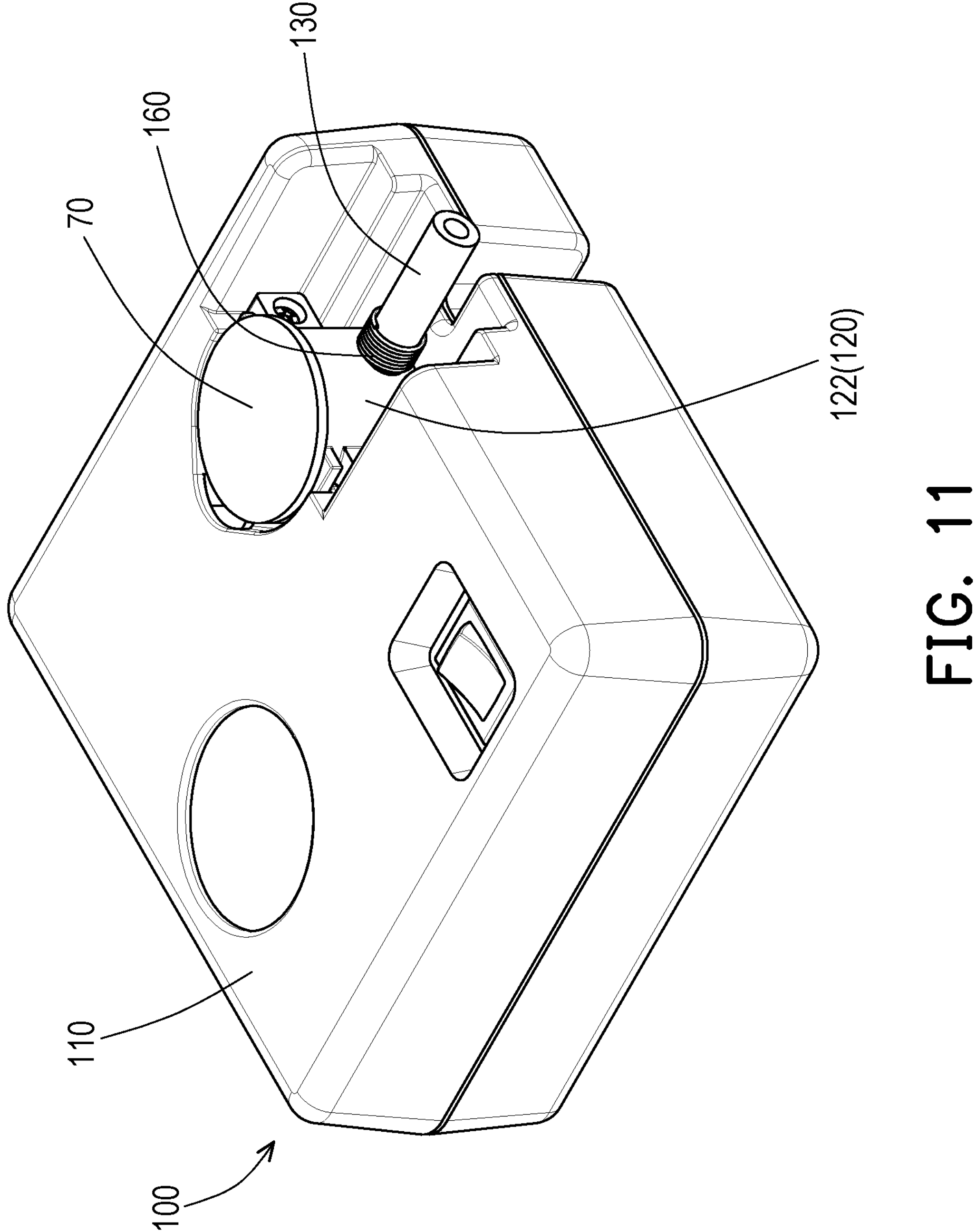
FIG. 11 illustrates the tire sealant containing bottle in FIG. 1 is replaced by a cover.
Figure 12:
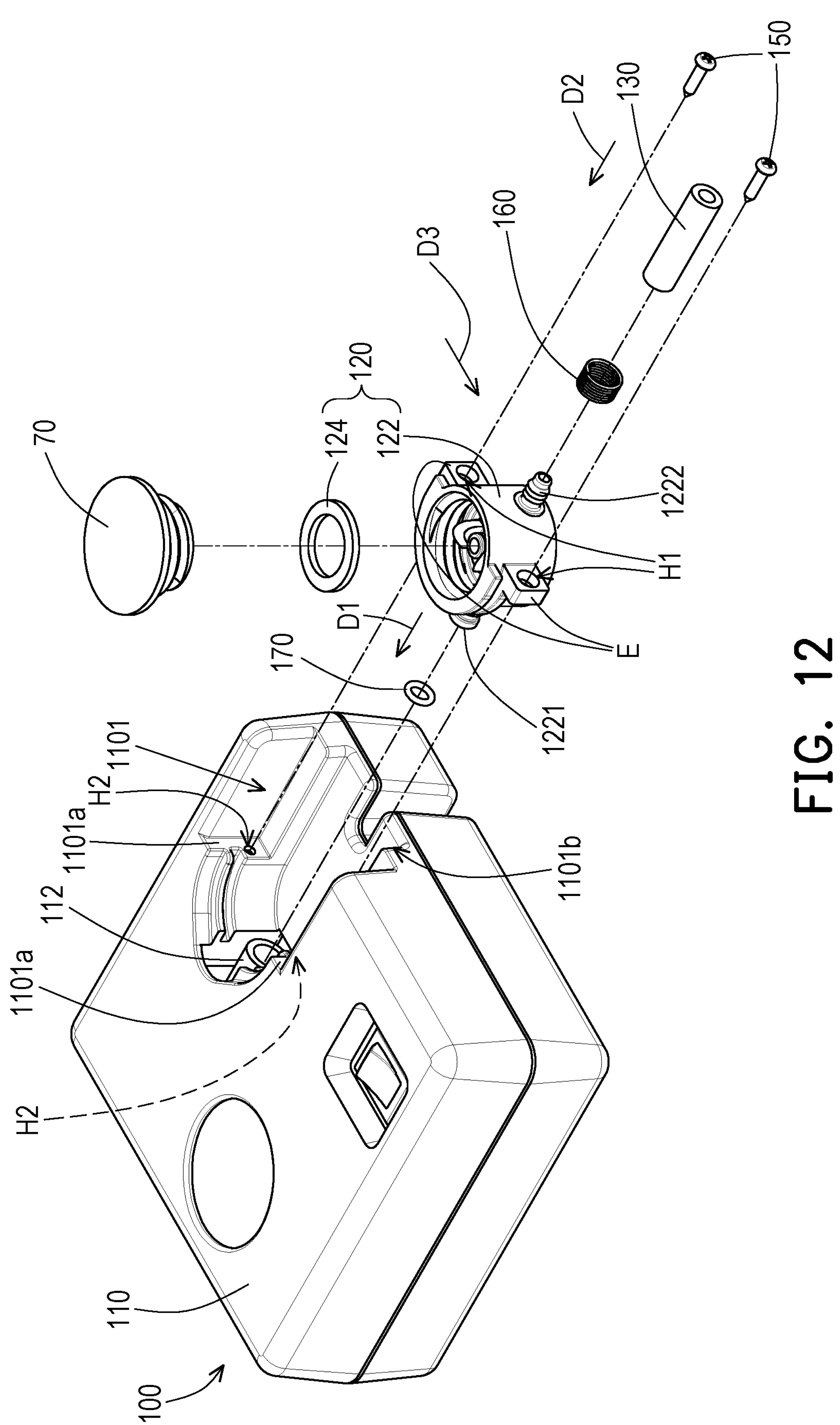
FIG. 12 illustrates the tire sealant containing bottle in FIG. 2 is replaced by a cover.
Figure 13A:
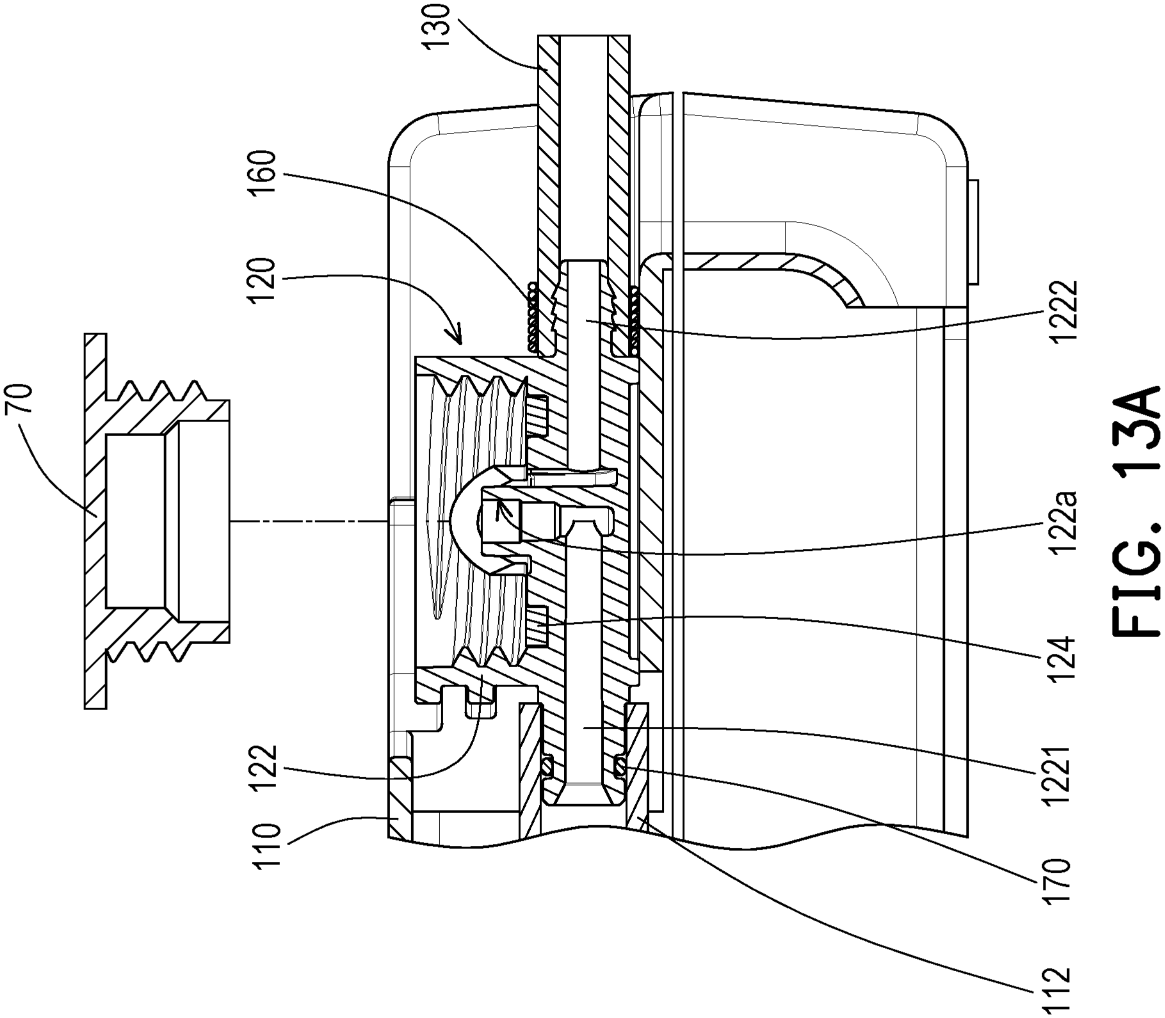
FIG. 13A illustrates the tire sealant containing bottle in FIG. 9D is replaced by a cover.
Figure 13B:
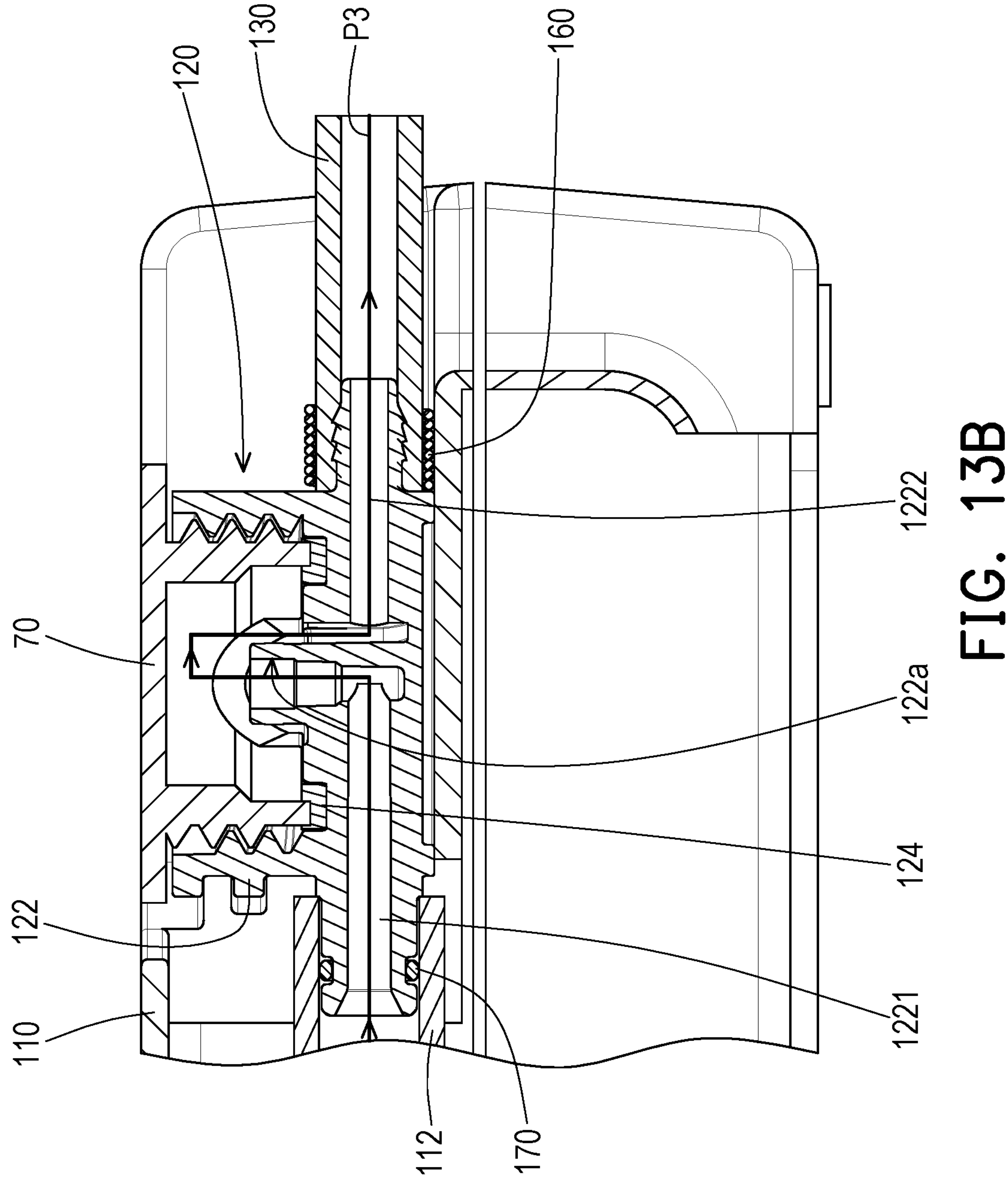
FIG. 13B illustrates the tire sealant containing bottle in FIG. 9E is replaced by a cover.

FIG. 11 illustrates the tire sealant containing bottle in FIG. 1 is replaced by a cover. FIG. 12 illustrates the tire sealant containing bottle in FIG. 2 is replaced by a cover. FIG. 13A illustrates the tire sealant containing bottle in FIG. 9D is replaced by a cover. FIG. 13B illustrates the tire sealant containing bottle in FIG. 9E is replaced by a cover. The vehicle-mounted air compressor 100 of this embodiment can only inflate the tire 60 without repairing the tire 60. Specifically, the tire sealant containing bottle 50 in FIG. 1, FIG. 2, FIG. 9D and FIG. 9E can be replaced by a cover 70 in FIG. 11, FIG. 12, FIG. 13A and FIG. 13B. The rest of the operation process is the same as above and will not be repeated here. Since the method shown in FIG. 11, FIG. 12, FIG. 13A and FIG. 13B does not use the tire sealant containing bottle 50, the high-pressure air flow from the air compressor main body 110 passes through the bottle cap assembly 120 and directly reaches the tire for inflation, as the flow path P3 shown in FIG. 13B.

A vehicle-mounted air compressor 100' of another embodiment of the invention is described below. The main difference from the previous embodiment is that the air inlet direction and the air outlet direction of the bottle cap component 120' of the vehicle-mounted air compressor 100' are perpendicular to each other, and the other parts are similar or identical to the previous embodiment. The specific description is as follows, in which the same or similar components to the previous embodiment are represented by the same or similar component symbols.

Figure 14:
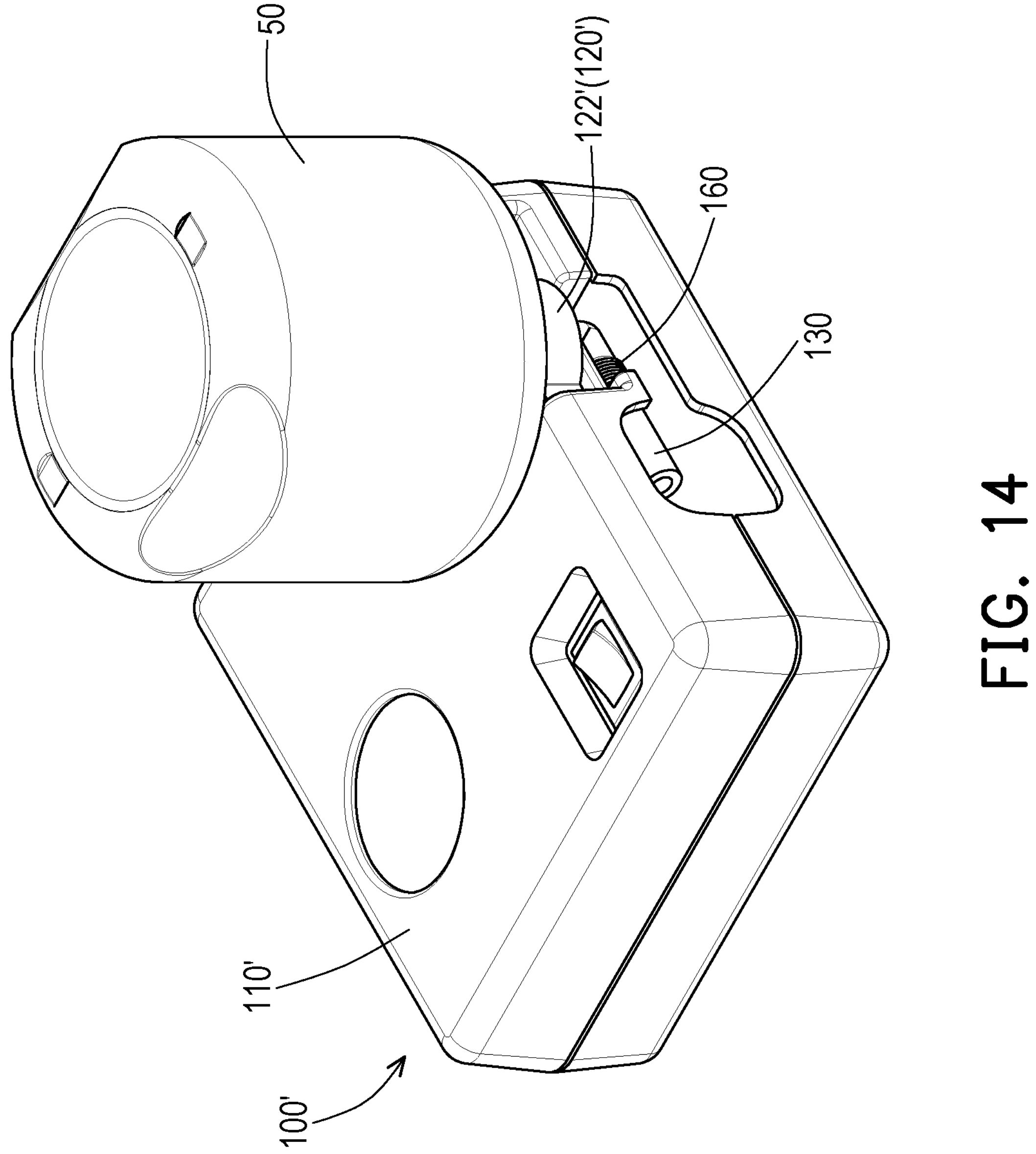
FIG. 14 is a three-dimensional view of a vehicle-mounted air compressor and a tire sealant containing bottle according to another embodiment of the invention.
Figure 15:
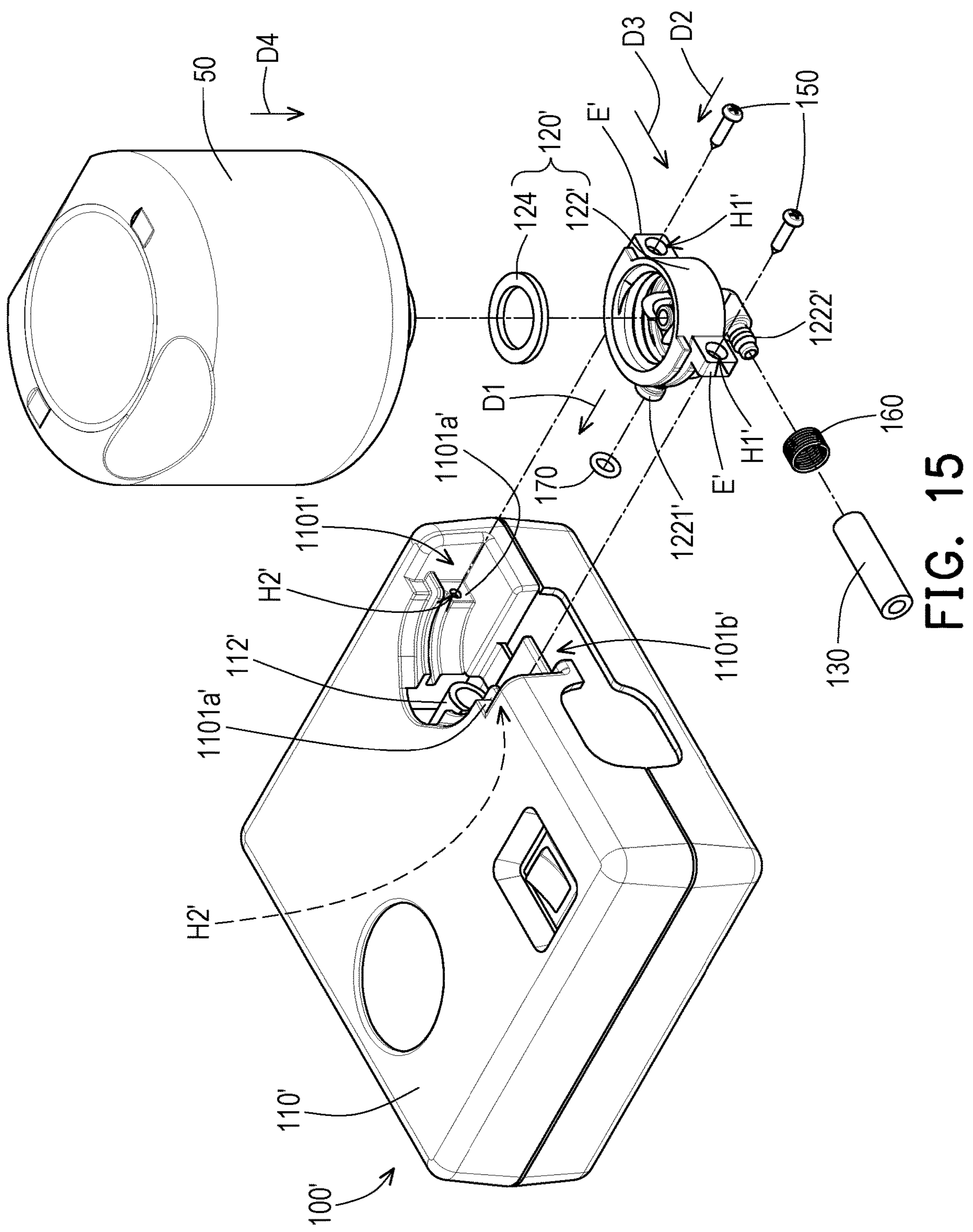
FIG. 15 is an exploded view of the vehicle-mounted air compressor and the tire sealant containing bottle in FIG. 14.
Figure 16:
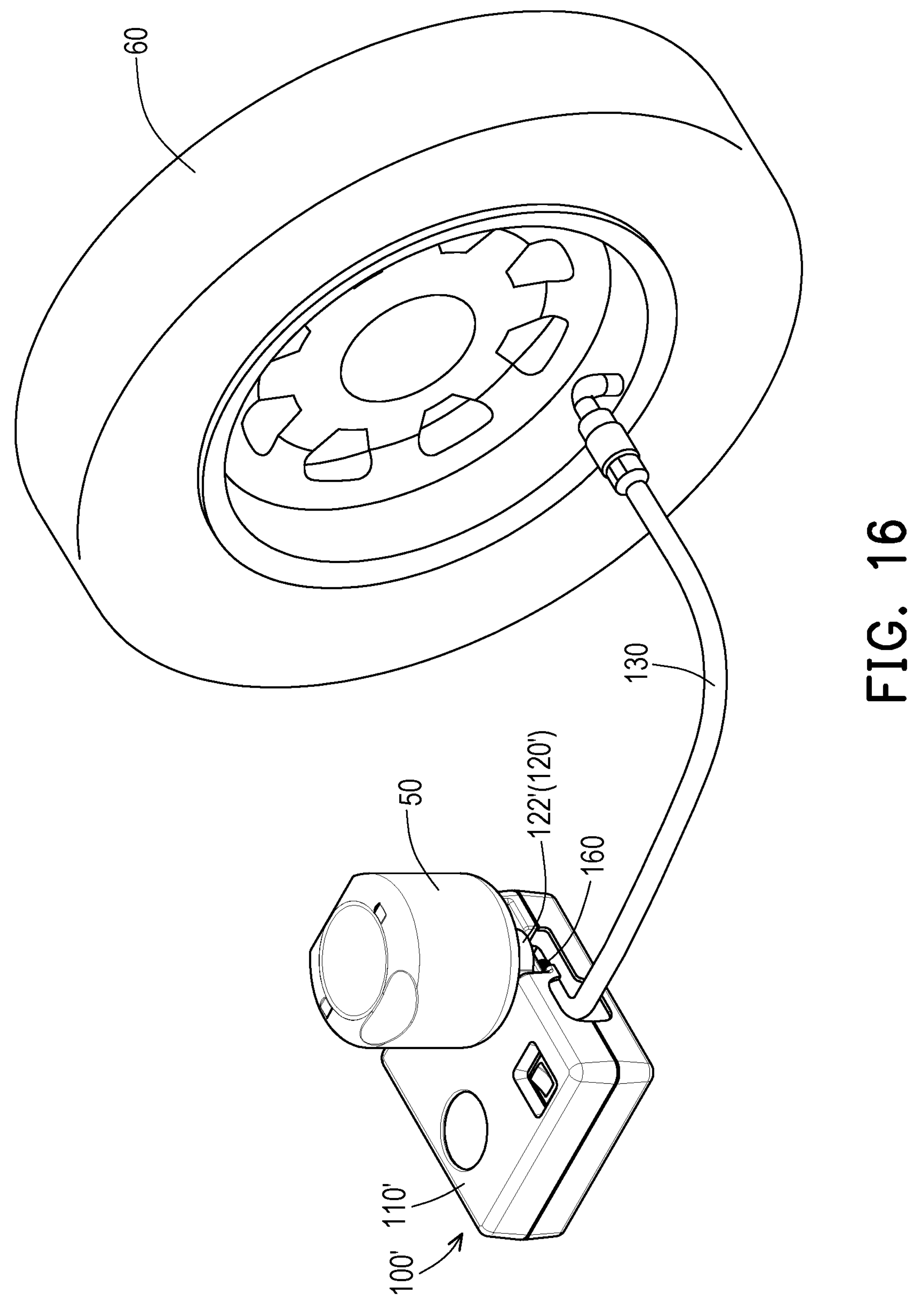
FIG. 16 is a three-dimensional view of the vehicle-mounted air compressor in FIG. 14 connecting to a tire.

FIG. 14 is a three-dimensional view of a vehicle-mounted air compressor and a tire sealant containing bottle according to another embodiment of the invention. FIG. 15 is an exploded view of the vehicle-mounted air compressor and the tire sealant containing bottle in FIG. 14. FIG. 16 is a three-dimensional view of the vehicle-mounted air compressor in FIG. 14 connecting to a tire. Referring to FIG. 14 to FIG. 16, the vehicle-mounted air compressor 100' of the embodiment includes an air compressor main body 110', a bottle cap assembly 120' and an connection pipe 130. The bottle cap assembly 120' includes a bottle cap component 122' and a sealing component 124. The bottle cap component 122' is installed on the air compressor main body 110' and has an air inlet end 1221' and an air outlet end 1222' connected to each other. The air inlet end 1221' and the air outlet end 1222' are, for example, columns protruding from an outer surface of the bottle cap component 122', and an air inlet direction of the air inlet end 1221' and an air outlet direction of air outlet end 1222' are, for example, perpendicular to each other. The air inlet end 1221' is adapted to be inserted to the air outlet pipe 112' of the air compressor main body 110' along an inserting direction D1 (illustrated in FIG. 15). The sealing component 124 is made of, for example, rubber, silicone or other types of elastic sealing materials and is disposed on the bottle cap component 122'. The tire sealant containing bottle 50 is configured to be coupled to the bottle cap component 122' along a coupling direction D4 (illustrated in FIG. 2). The bottle cap component 122' can be connected to the tire 60 through the connection pipe 130.

The high-pressure air flow from the air compressor main body 110' is adapted to enter the bottle cap component 122' through the air inlet end 1221' of the bottle cap component 122', and reaches the tire sealant containing bottle 50 through the bottle cap component 122', such that a tire sealant in the tire sealant containing bottle 50 is driven to pass through the bottle cap component 122', leave the bottle cap component 122' through the air outlet end 1222' of the bottle cap component 122' and flow toward the tire 60 through the connection pipe 130 by the high-pressure air flow, so as to perform tire repair and inflation operations. The method and principle of the air compressor main body 110' generating the high-pressure air flow are known in the technical field and will not be described in detail here.

The air compressor main body 110' of the embodiment further includes at least one fastening component 150 (two are illustrated). The fastening components 150 fasten the bottle cap component 122' to the air compressor main body 110' along a fastening direction D2 (illustrated in FIG. 2), and the fastening direction D2 is the same as the inserting direction D1.

As described above, the vehicle-mounted air compressor 100' of the embodiment fastens the bottle cap component 122' to the air compressor main body 110' by the fastening components 150, the user only needs to simply install the bottle cap component 122' to the air compressor main body 110' and lock the fastening components 150 for installing the bottle cap component 122', and the user only needs to simply remove the fastening components 150 and then remove the bottle cap component 122' for completing the disassembly of the bottle cap component 122' and/or the replacement of the tire sealant containing bottle 50. Furthermore, by setting the fastening direction D2 of the fastening components 150 to be the same as the inserting direction D1 of the air inlet end 1221' of the bottle cap component 122', the embodiment allows the user to sequentially install the bottle cap component 122 and fasten the fastening components 150 in a convenient and identical working direction.

Figure 17:
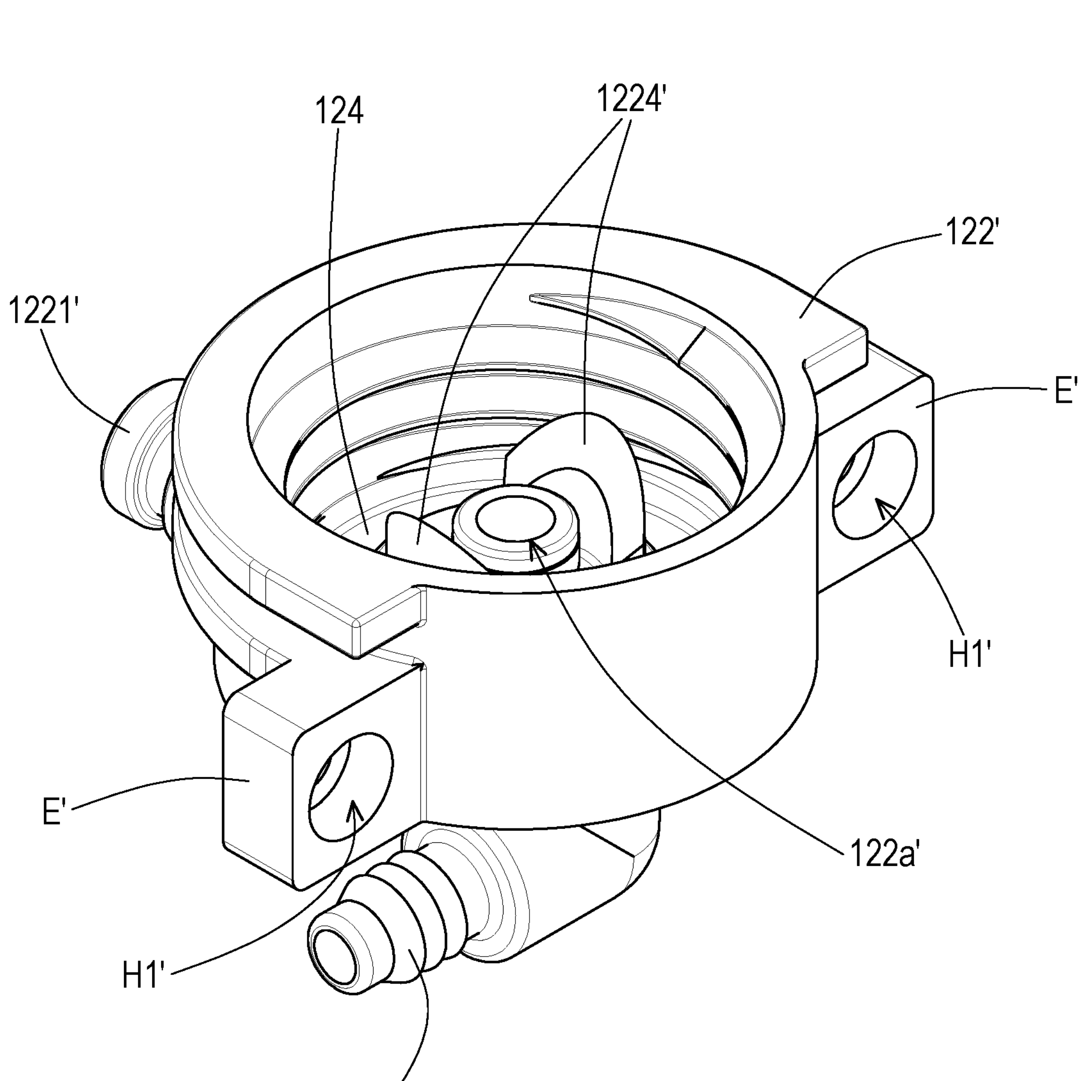
FIG. 17 is a three-dimensional view of the bottle cap component in FIG. 14.
Figure 18:
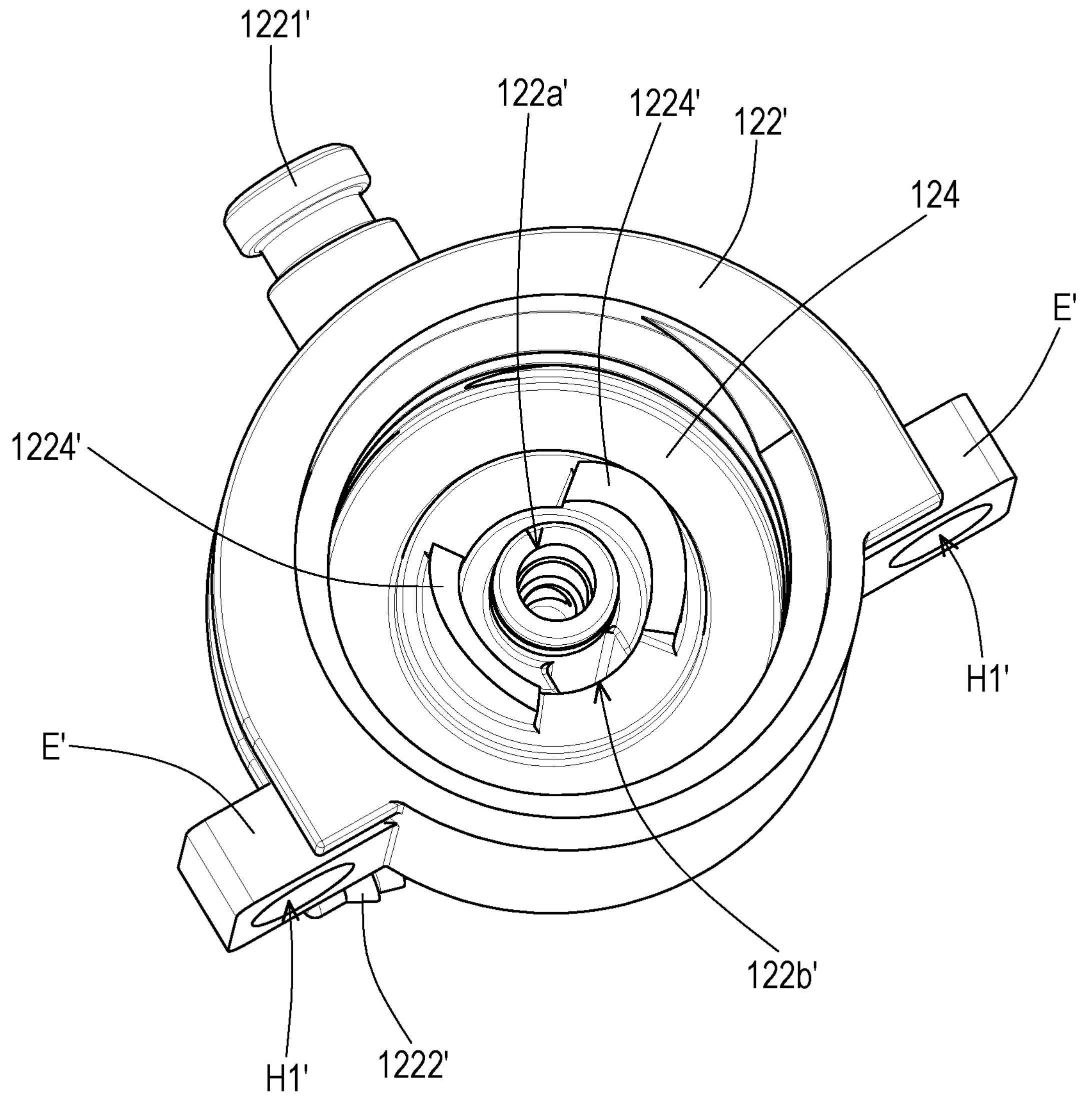
FIG. 18 is a three-dimensional view of the bottle cap component in FIG. 17 in another viewing angle.

FIG. 17 is a three-dimensional view of the bottle cap component in FIG. 14. FIG. 18 is a three-dimensional view of the bottle cap component in FIG. 17 in another viewing angle. Referring to FIG. 15, FIG. 17 and FIG. 18, in detail, the bottle cap component 122' of the embodiment has two ear portions E' and two assembling holes H1' on the two ear portions E' respectively. The two fastening components 150 are, for example, screws, which pass through the two assembling holes H1' respectively and are locked to the air compressor main body 110'. Furthermore, the two assembling holes H1' are arranged along an arrangement direction D3 (illustrated in FIG. 15) perpendicular to the fastening direction D2 and the coupling direction D4 to be located at two opposite sides of the bottle cap component 122', such that the fastening components 150 can fasten the bottle cap component 122' firmly.

Referring to FIG. 15, in the embodiment, the air compressor main body 110' has an accommodating concave portion 1101' and two locking holes H2', the accommodating concave portion 1101' has inner walls 1101*a*' perpendicular to the fastening direction D2, and the locking holes H2' are on the inner walls 1101*a*' to be located in the accommodating concave portion 1101'. The bottle cap component 122' is accommodated in the accommodating concave portion 1101', the two fastening components 150 passing through the two assembling holes H1' are locked to the two locking holes H2' respectively. Furthermore, the accommodating concave portion 1101' has an opening end 1101*b*', and a locking tool (such as a screwdriver) is adapted to reach the locking hole H2' through the opening end 1101*b*' and lock the fastening component 150 to the locking hole H2'.

Figure 19:
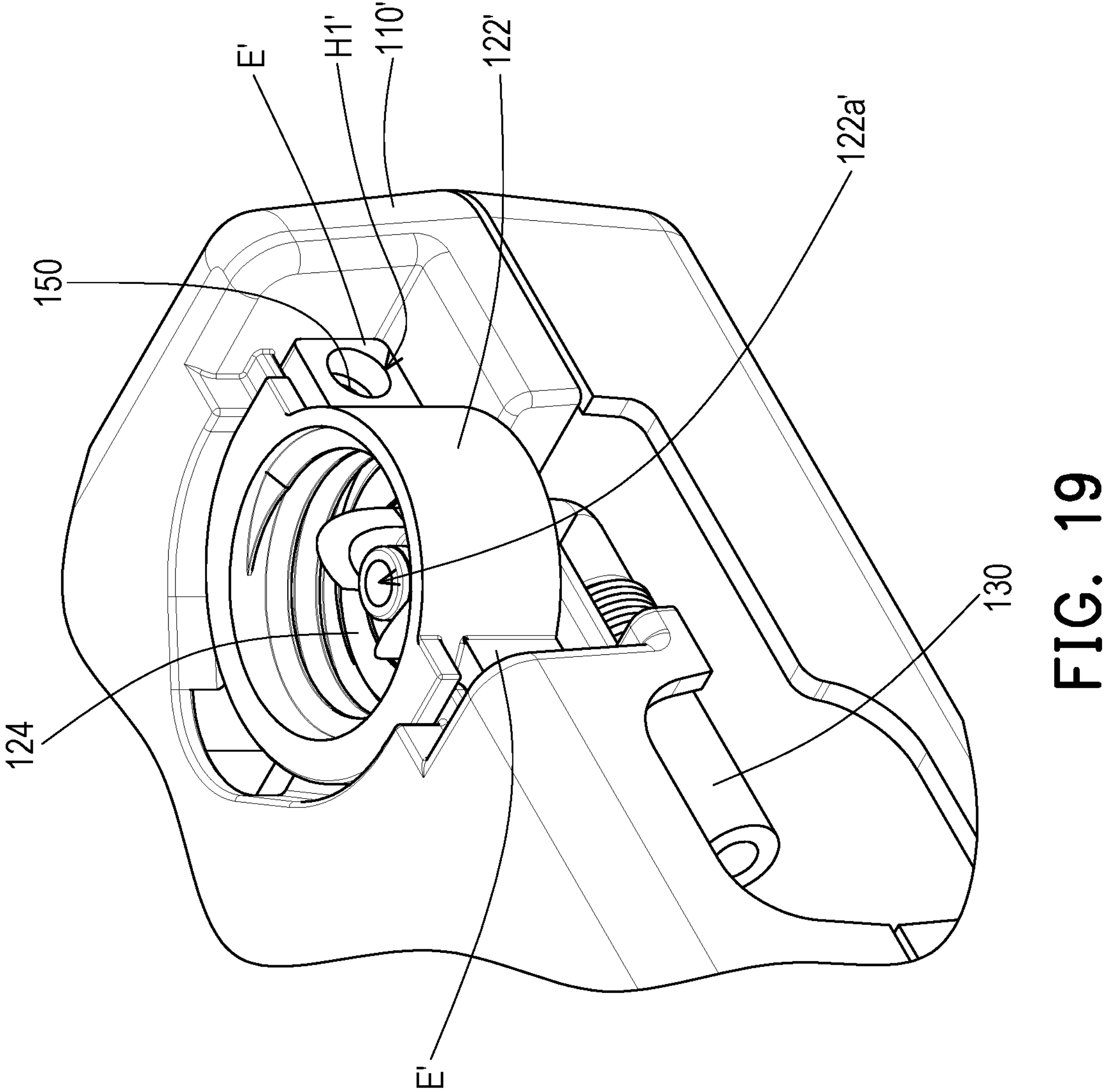
FIG. 19 is a partial three-dimensional view of the vehicle-mounted air compressor in FIG. 14.
Figure 20:
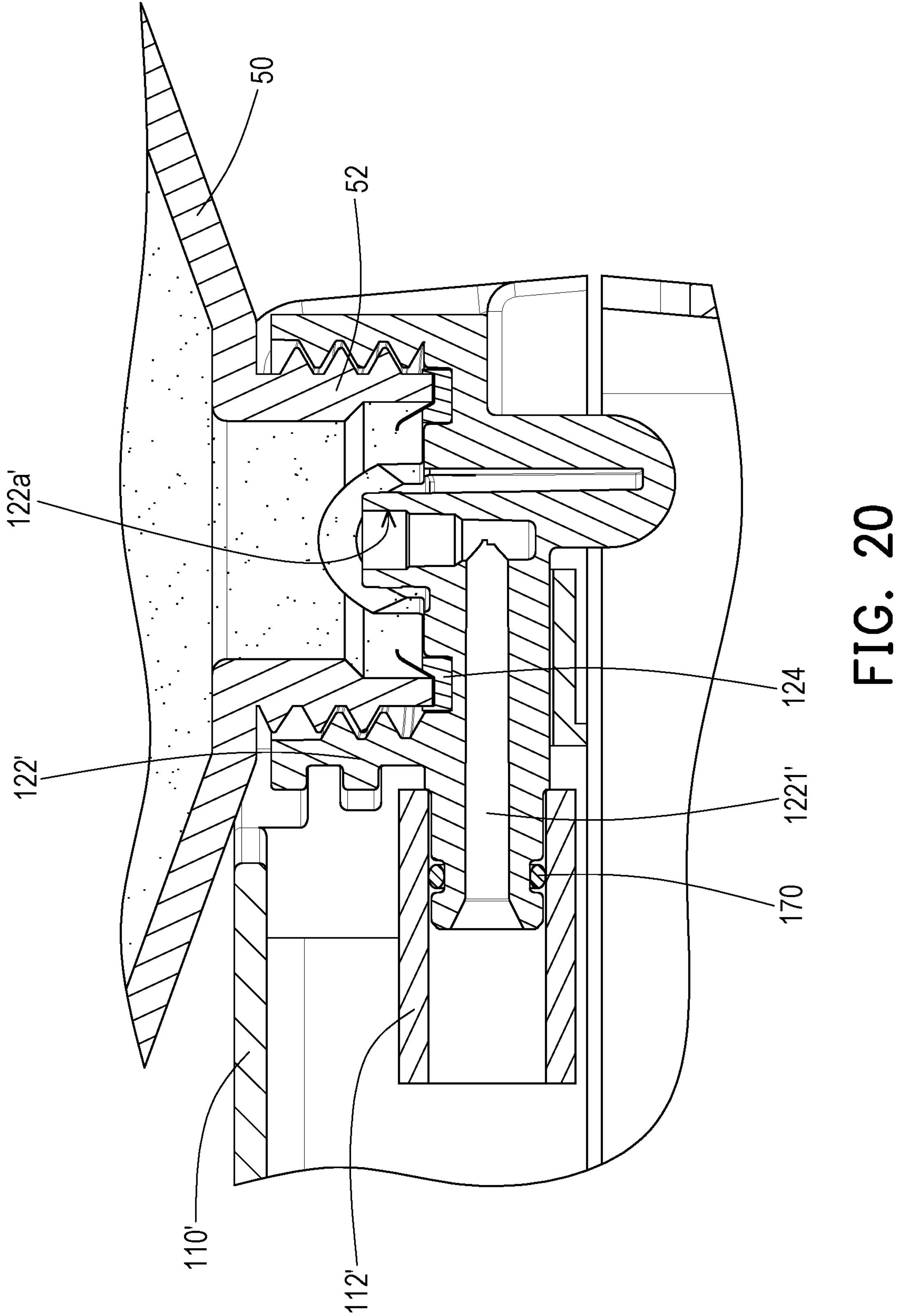
FIG. 20 is a partial cross-sectional view of the vehicle-mounted air compressor and the tire sealant containing bottle in FIG. 14.

FIG. 19 is a partial three-dimensional view of the vehicle-mounted air compressor in FIG. 14. FIG. 20 is a partial cross-sectional view of the vehicle-mounted air compressor and the tire sealant containing bottle in FIG. 14. Referring to FIG. 19 and FIG. 20, the sealing component 124 of the embodiment is in the bottle cap component 122' and surrounds the air inlet opening 122*a*'. When the bottle mouth 52 of the tire sealant containing bottle 50 is coupled to the bottle cap component 122', the bottle mouth 52 of the tire sealant containing bottle 50 presses the sealing component 124, such that the sealing component 124 is compressed between the bottle cap component 122' and the bottle mouth 52 of the tire sealant containing bottle 50, so as to prevent the tire sealant in the tire sealant containing bottle 50 from flowing out through the gap between the bottle mouth 52 and the bottle cap component 122'.

Figure 21:
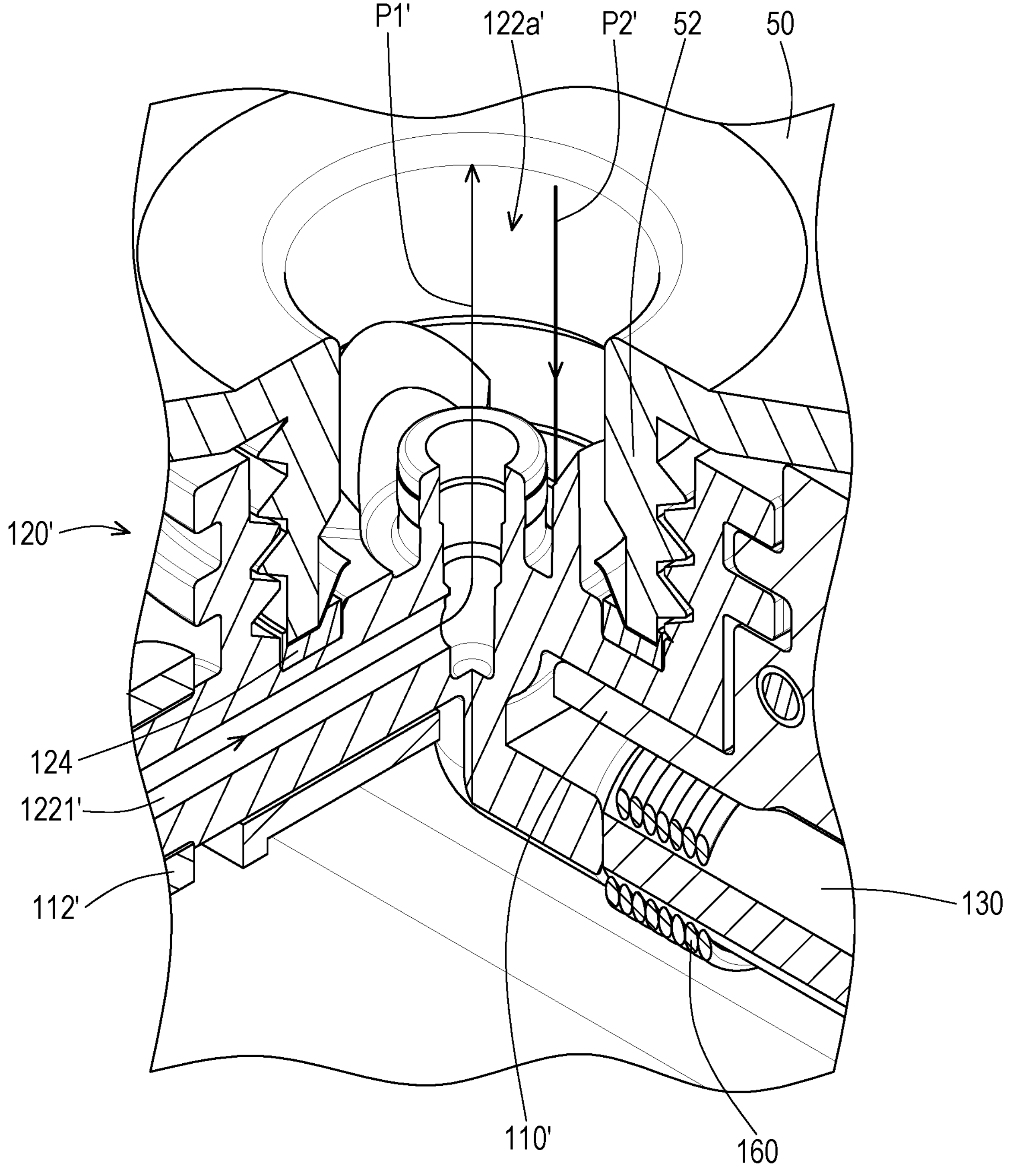
FIG. 21 illustrates partial structures of the vehicle-mounted air compressor and the tire sealant containing bottle in FIG. 14.
Figure 22:
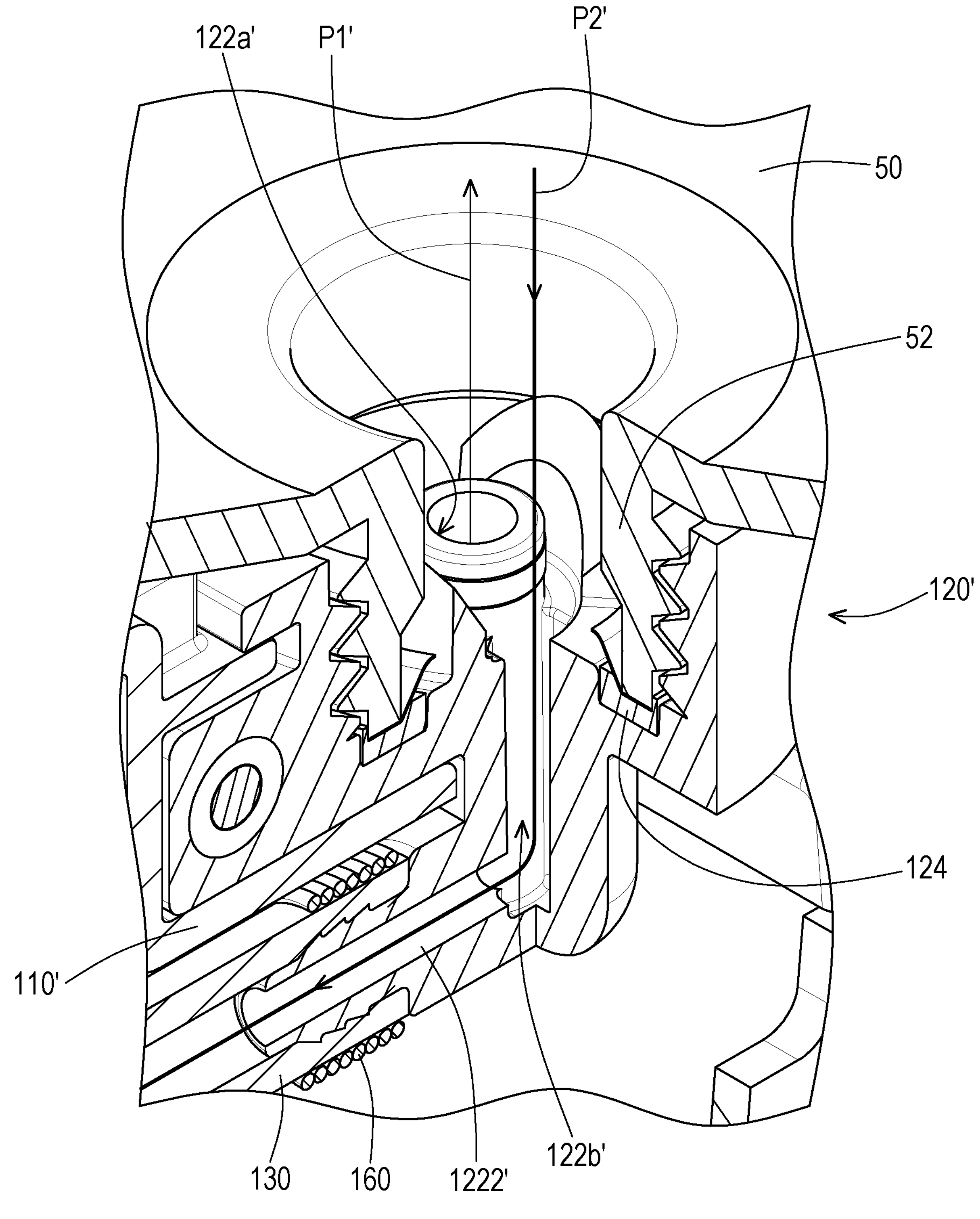
FIG. 22 illustrates partial structures of the vehicle-mounted air compressor and the tire sealant containing bottle in FIG. 14.

FIG. 21 illustrates partial structures of the vehicle-mounted air compressor and the tire sealant containing bottle in FIG. 14. FIG. 22 illustrates partial structures of the vehicle-mounted air compressor and the tire sealant containing bottle in FIG. 14. Referring to FIG. 21 and FIG. 22, specifically, the high-pressure air flow from the air compressor main body 110' (illustrated in FIG. 1) can pass through the air inlet end 1221' and the air inlet opening 122*a*' in sequence along the flowing path P1' shown in FIG. 21 to reach inside of the tire sealant containing bottle 50, and the tire sealant in the tire sealant containing bottle 50 can pass through the air outlet opening 122*b*' and air outlet end 1222' in sequence along the flowing path P2' shown in FIG. 22 with the high-pressure air flow to flow toward the tire 60 (illustrated in FIG. 3) through the connection pipe 130.

Referring to FIG. 18, in the embodiment, the bottle cap component 122' has two cutting ribs 1224'. During the coupling process of the tire sealant containing bottle 50 and the bottle cap component 122', the cutting rib 1224' is adapted to cut the sealing film on the bottle mouth 52 of the tire sealant containing bottle 50, so that the bottle cap component 122' is smoothly connected to the inner space of the tire sealant containing bottle 50.

The following describes the operation flow of the vehicle-mounted air compressor of the embodiment.

Figure 23A:
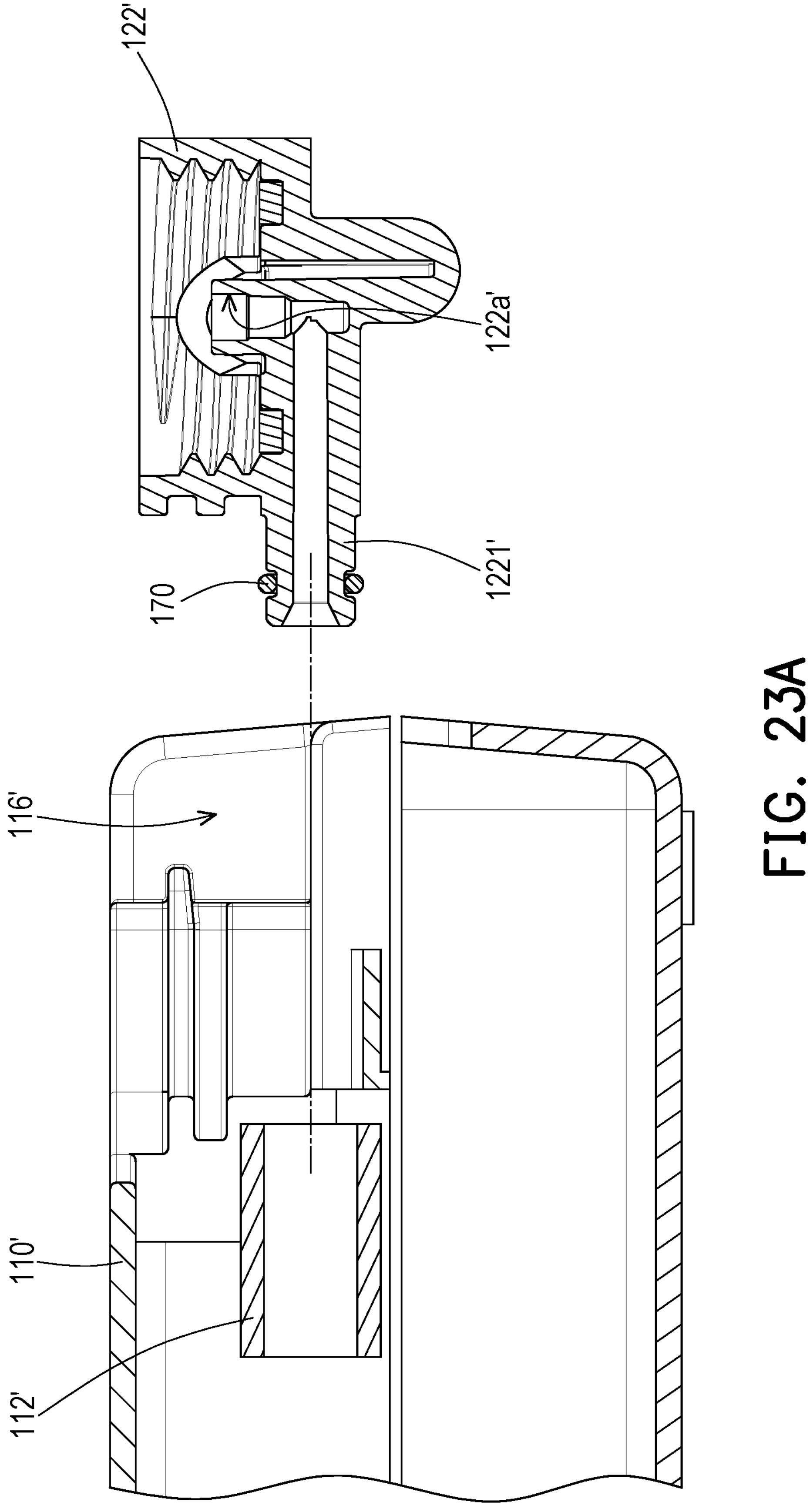
FIG. 23A to FIG. 23E are flowcharts illustrating operation of the vehicle-mounted air compressor in FIG. 14.
Figure 23B:
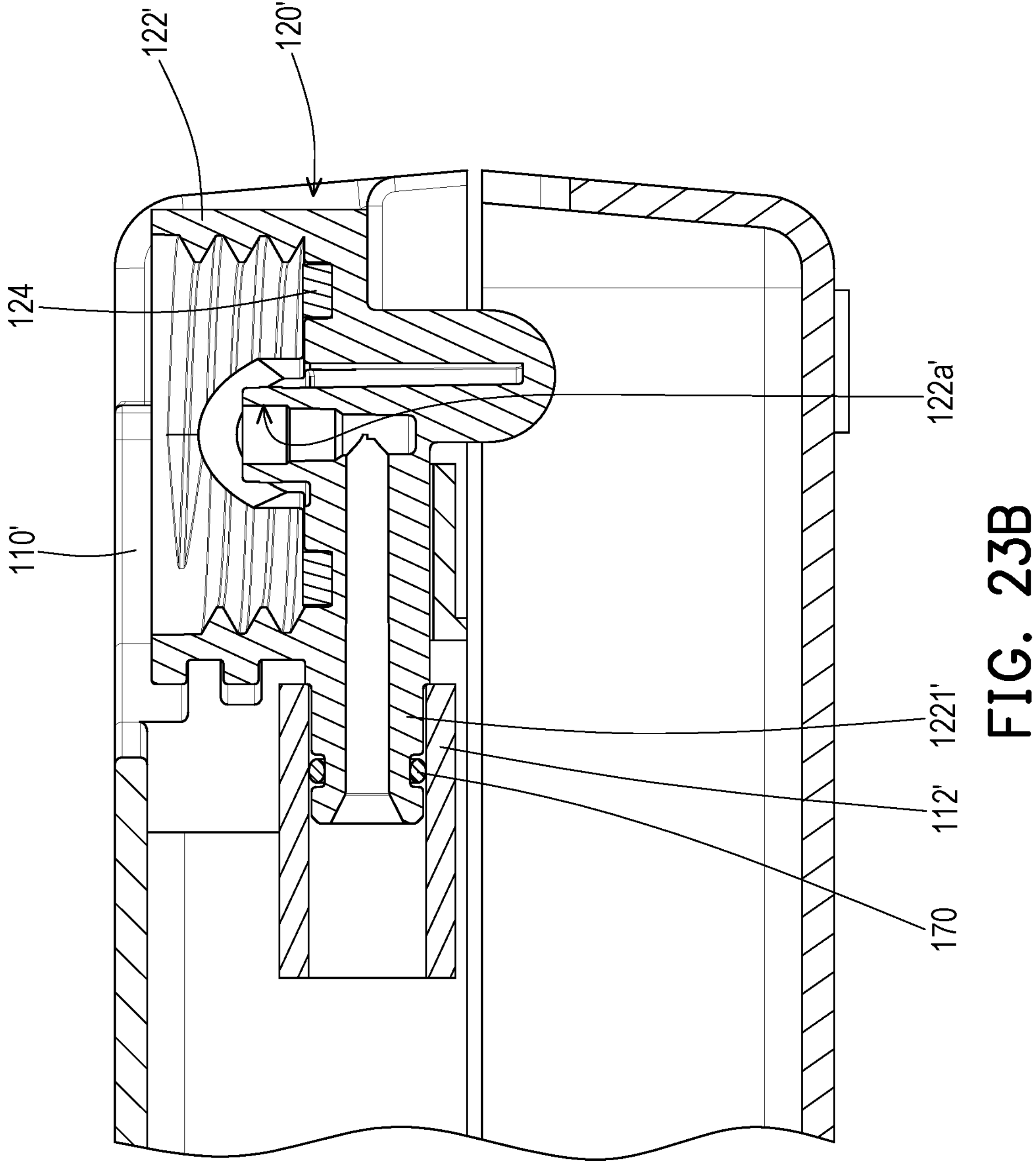

FIG. 23A to FIG. 23B are flowcharts illustrating operation of the vehicle-mounted air compressor in FIG. 14. FIG. 24A to FIG. 24C are top views of the vehicle-mounted air compressor in FIG. 23A to FIG. 23C respectively. First, after installing the connection pipe 130 (illustrated in FIG. 15) on the bottle cap component 122', as shown in FIG. 23A (FIG. 24A) to FIG. 23B (FIG. 24B), the bottle cap component 122' is installed on the air compressor main body 110' under the guidance of the two guiding surfaces 116' of the air compressor main body 110', and at the same time, the air inlet end 1221' of the bottle cap component 122' is inserted to the air outlet pipe 112' of the air compressor main body 110', such that the air outlet pipe 112' is connected to the air inlet opening 122*a*'. The gap between the air inlet end 1221' and the air outlet pipe 112' can be sealed by a sealing ring 170 set on the air inlet end 1221'. In addition, the top surface of the air compressor main body 110' has an opening 110*a*', and the interconnection between the air outlet pipe 112' and the bottle cap component 122' is corresponding to the opening 110*a*' as shown in FIG. 24B, such that the user is convenient to visually confirm whether the air outlet pipe 112' and the bottle cap component 122' are indeed connected through the opening 110*a'*.

Figure 23C:
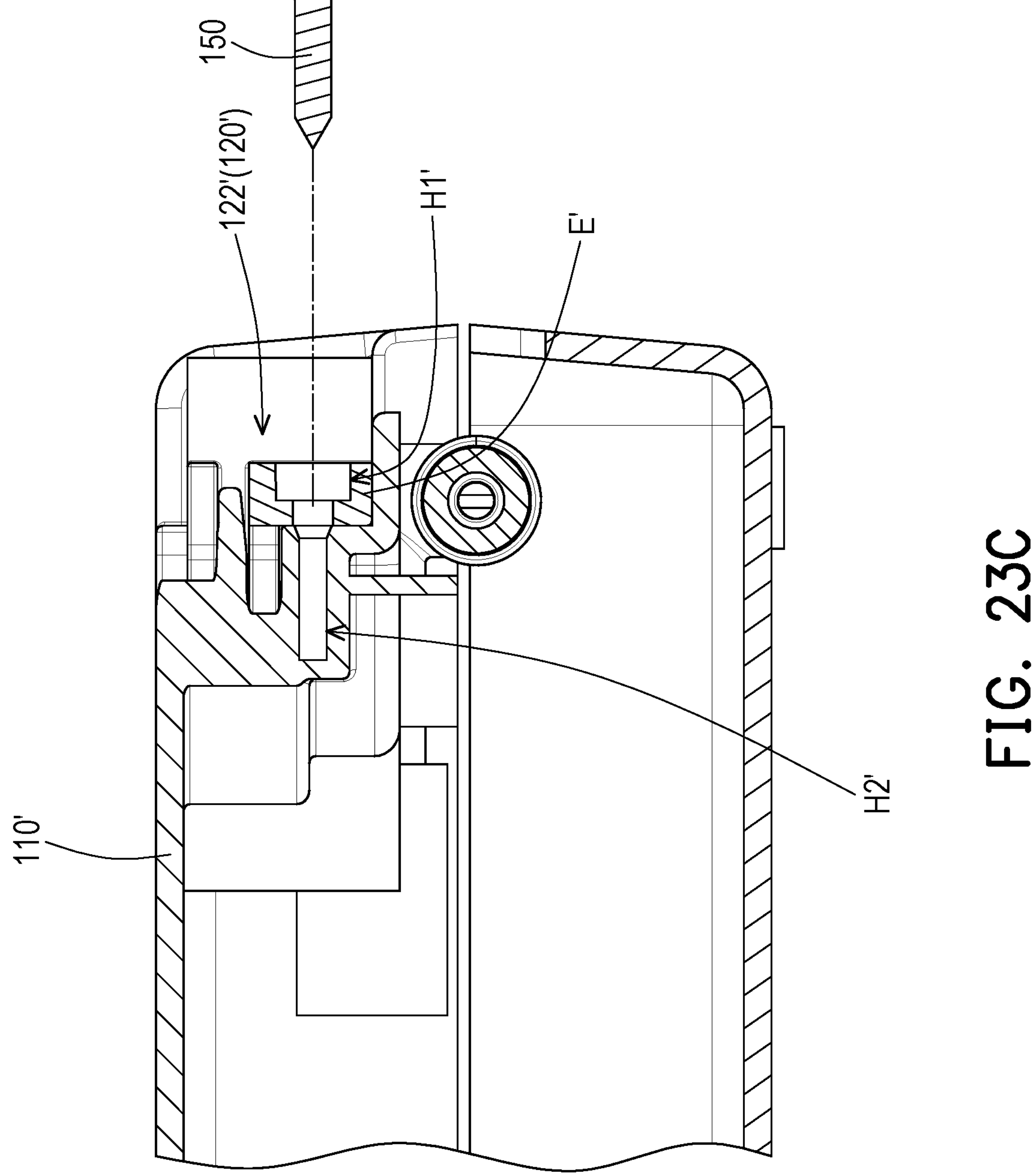
Figure 23D:
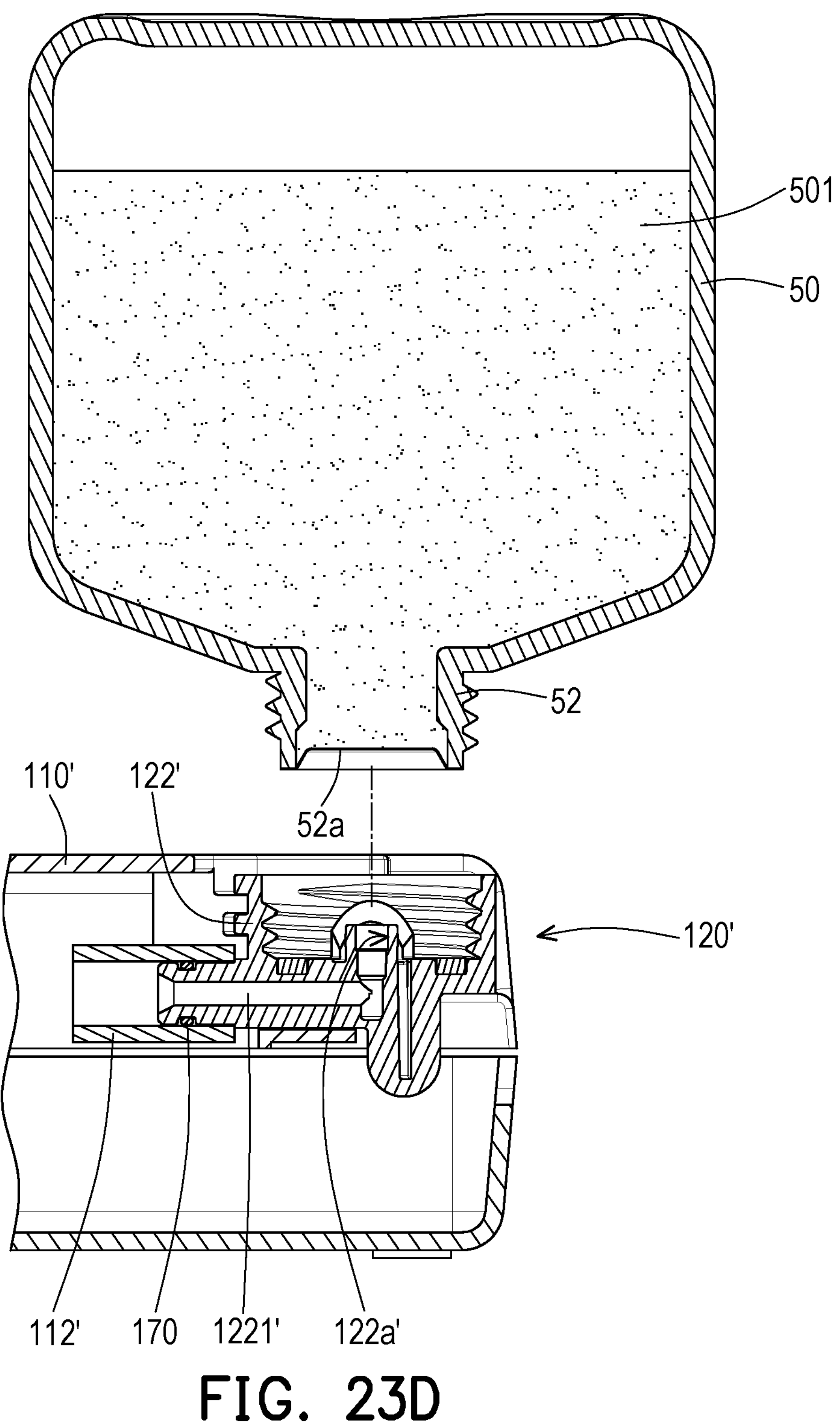
Figure 23E:
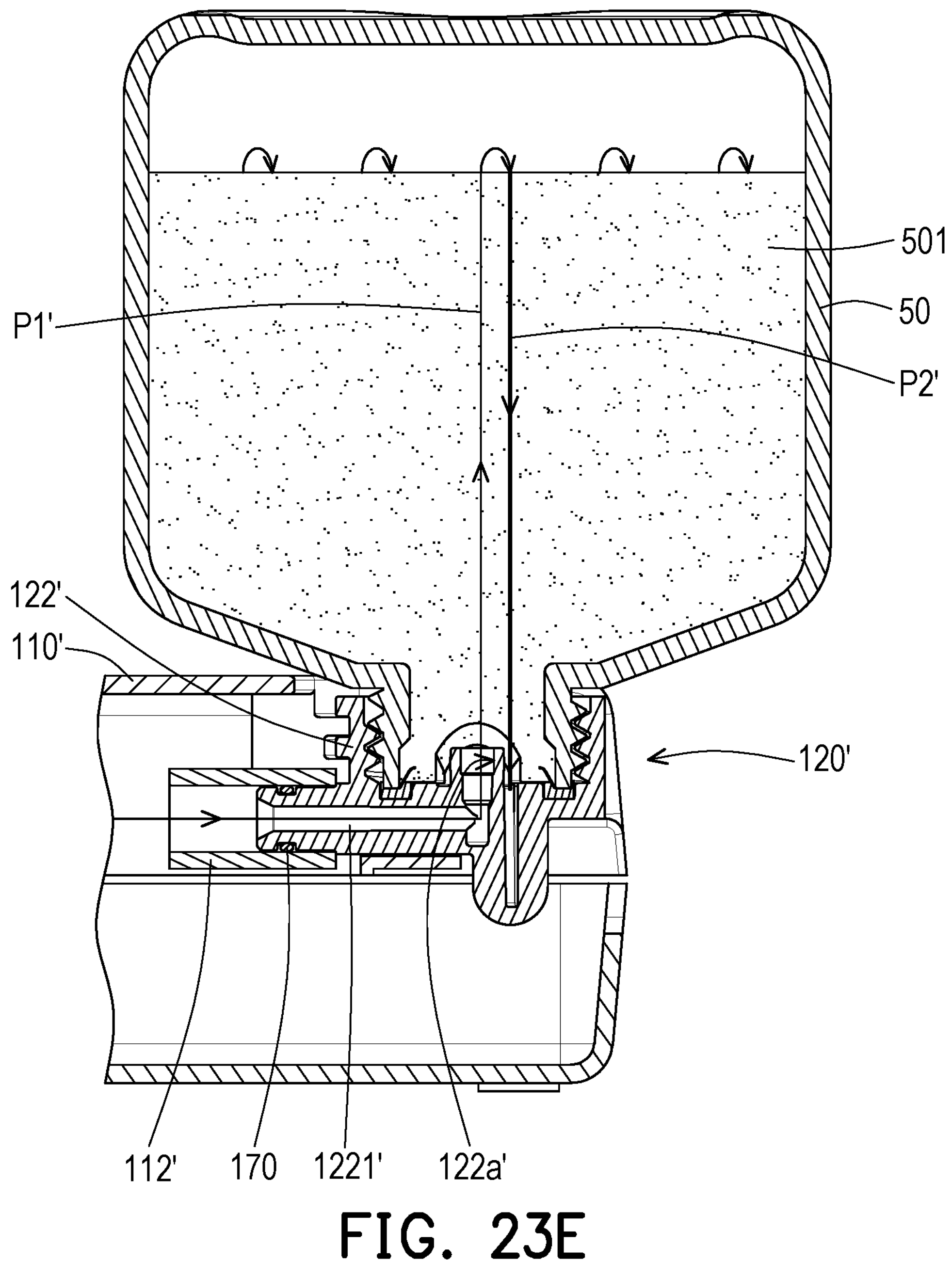
Figure 24A:
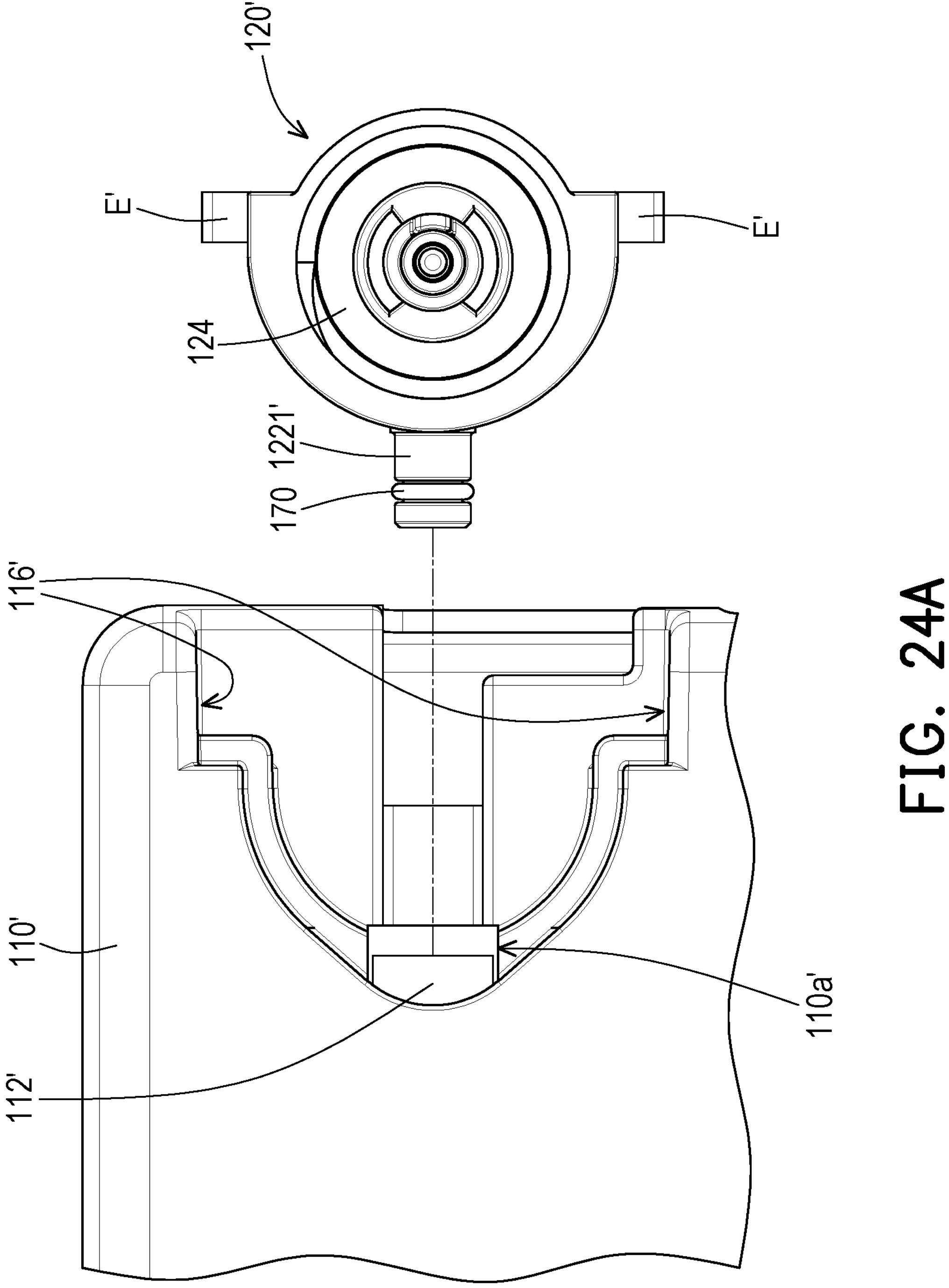
FIG. 24A to FIG. 24C are top views of the vehicle-mounted air compressor in FIG. 23A to FIG. 23C respectively.
Figure 24B:
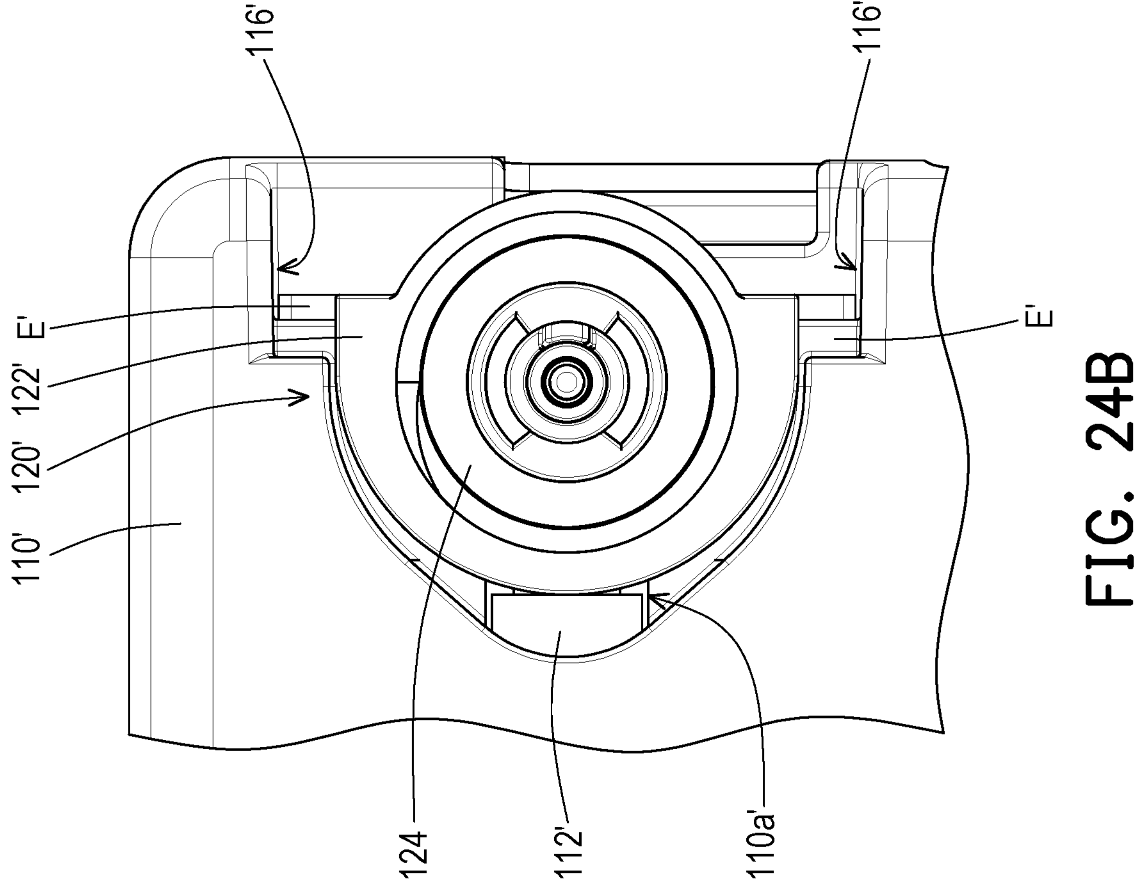
Figure 24C:
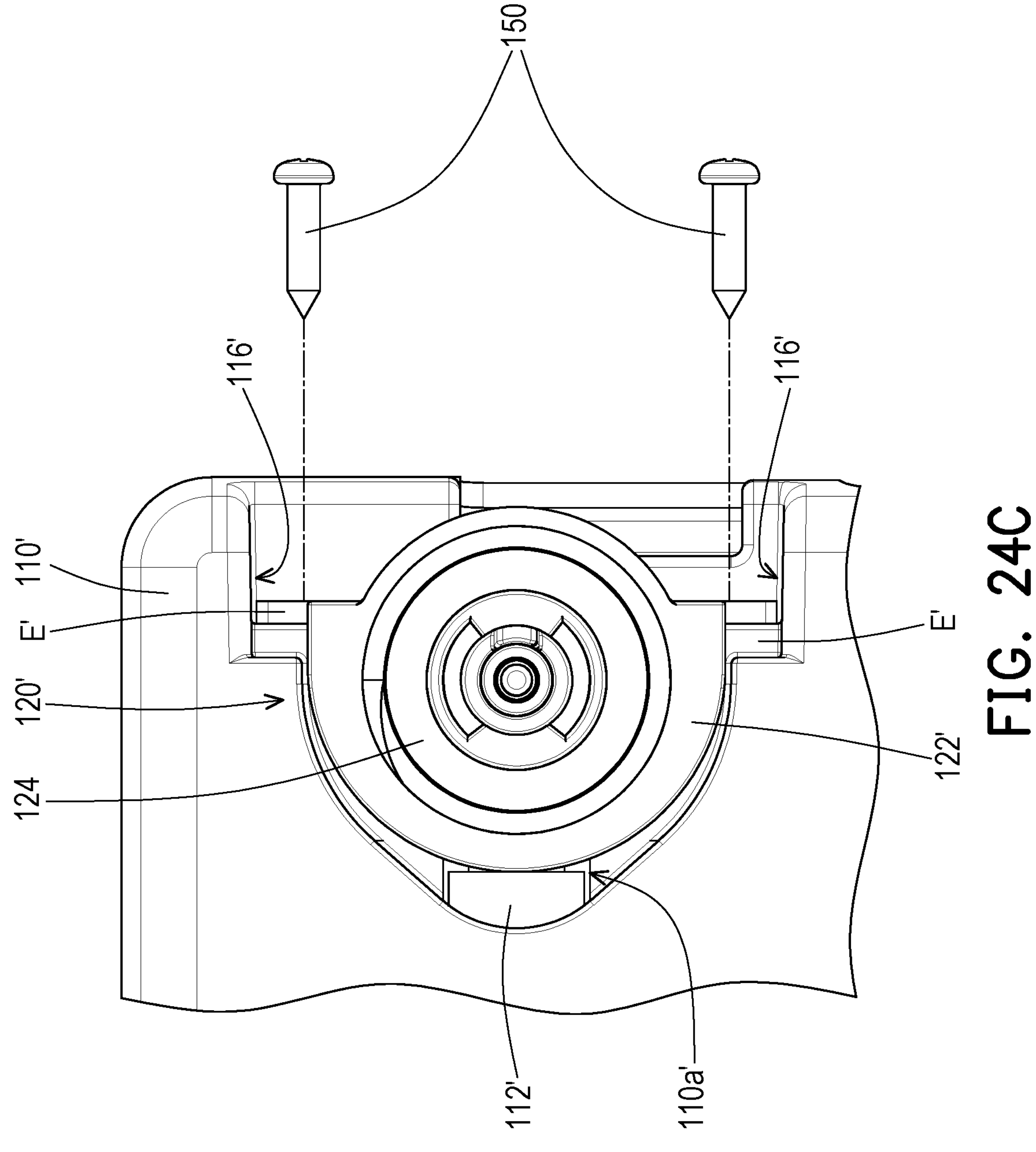

Then, as shown in FIG. 23C and FIG. 24C, the bottle cap component 122' is fastened to the air compressor main body 110' by the fastening components 150 to obtain the state shown in FIG. 23D. Then, as shown in FIG. 23D to FIG. 23E, the bottle mouth 52 of the tire sealant containing bottle 50 is coupled to the bottle cap component 122'. During this process, the sealing film 52*a* at the bottle mouth 52 will be cut by the cutting ribs 1224' (illustrated in FIG. 18) of the bottle cap component 122', so that the high-pressure air flow from the air compressor main body 110' can enter the tire sealant containing bottle 50 along the flowing path P1' during subsequent inflation and tire repair operations, and the tire sealant 501 in the tire sealant containing bottle 50 can leave the tire sealant containing bottle 50 along the flowing path P2' with the high-pressure air flow during subsequent inflation and tire repair operations. Finally, the connection pipe 130 is connected to the tire 60 as shown in FIG. 16, and then the inflation and tire repair operations can be performed to the tire 60 by the vehicle-mounted air compressor 100'.

Figure 25:
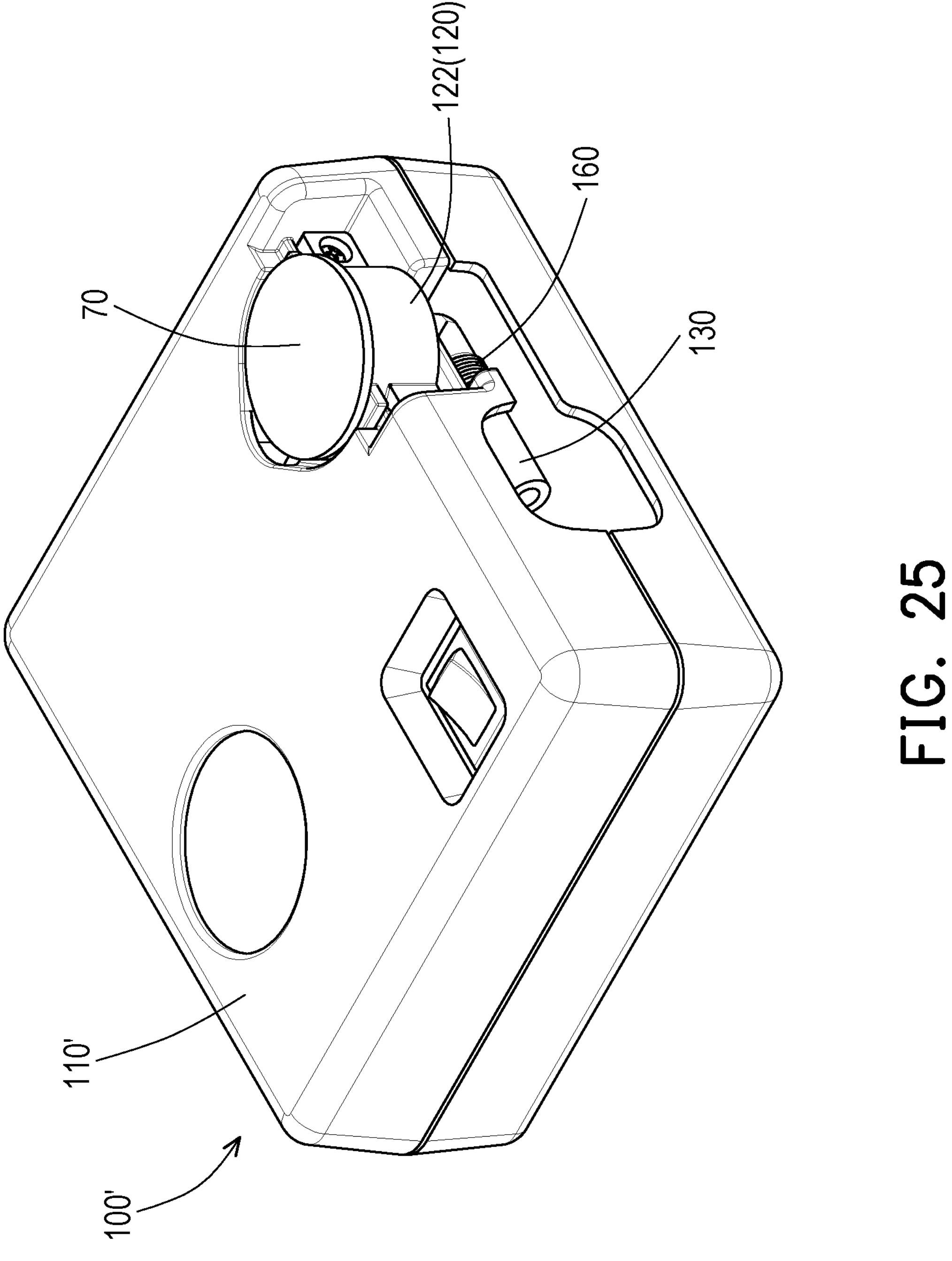
FIG. 25 illustrates the tire sealant containing bottle in FIG. 14 is replaced by a cover.
Figure 26:
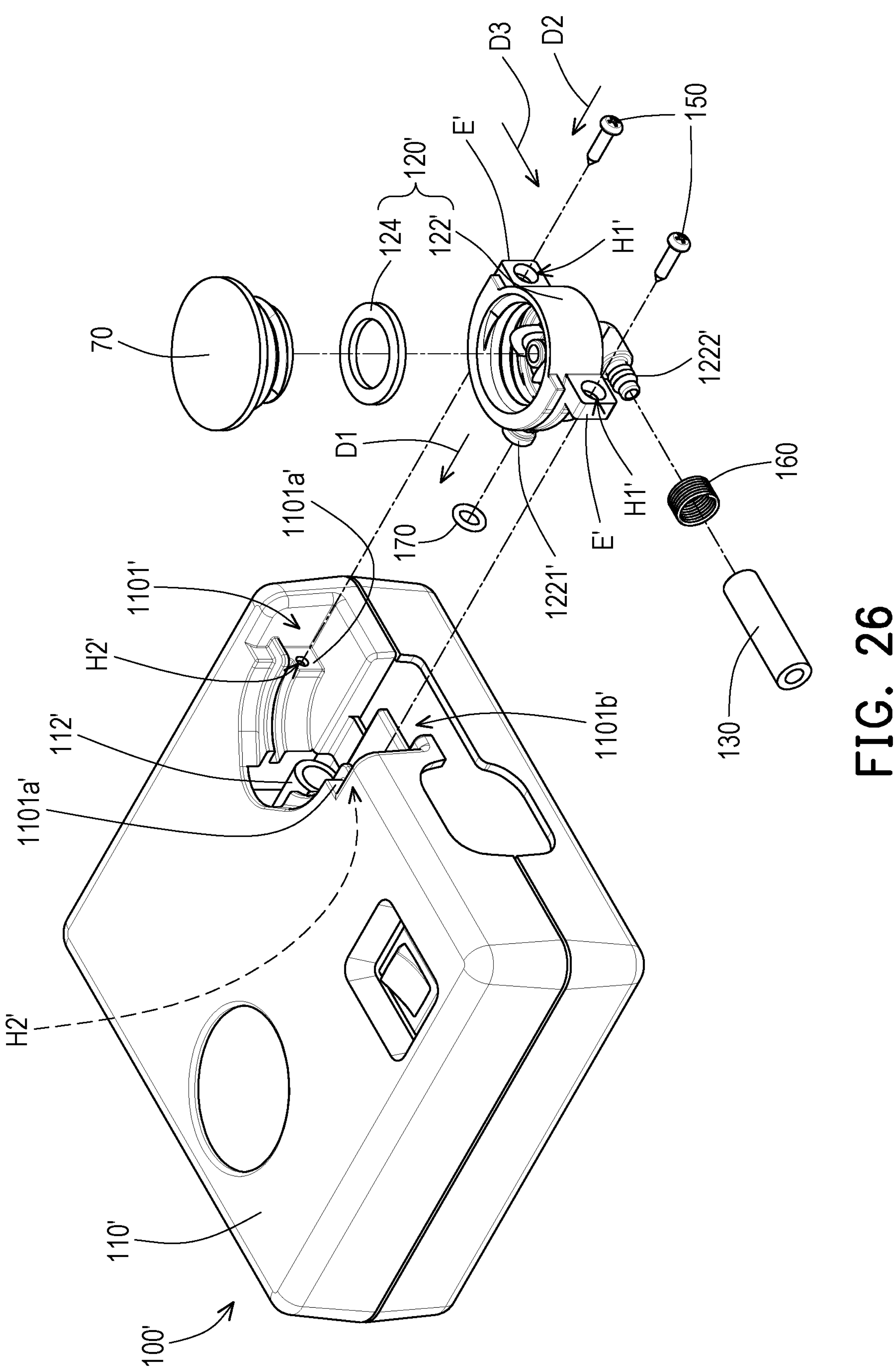
FIG. 26 illustrates the tire sealant containing bottle in FIG. 15 is replaced by a cover.
Figure 27A:
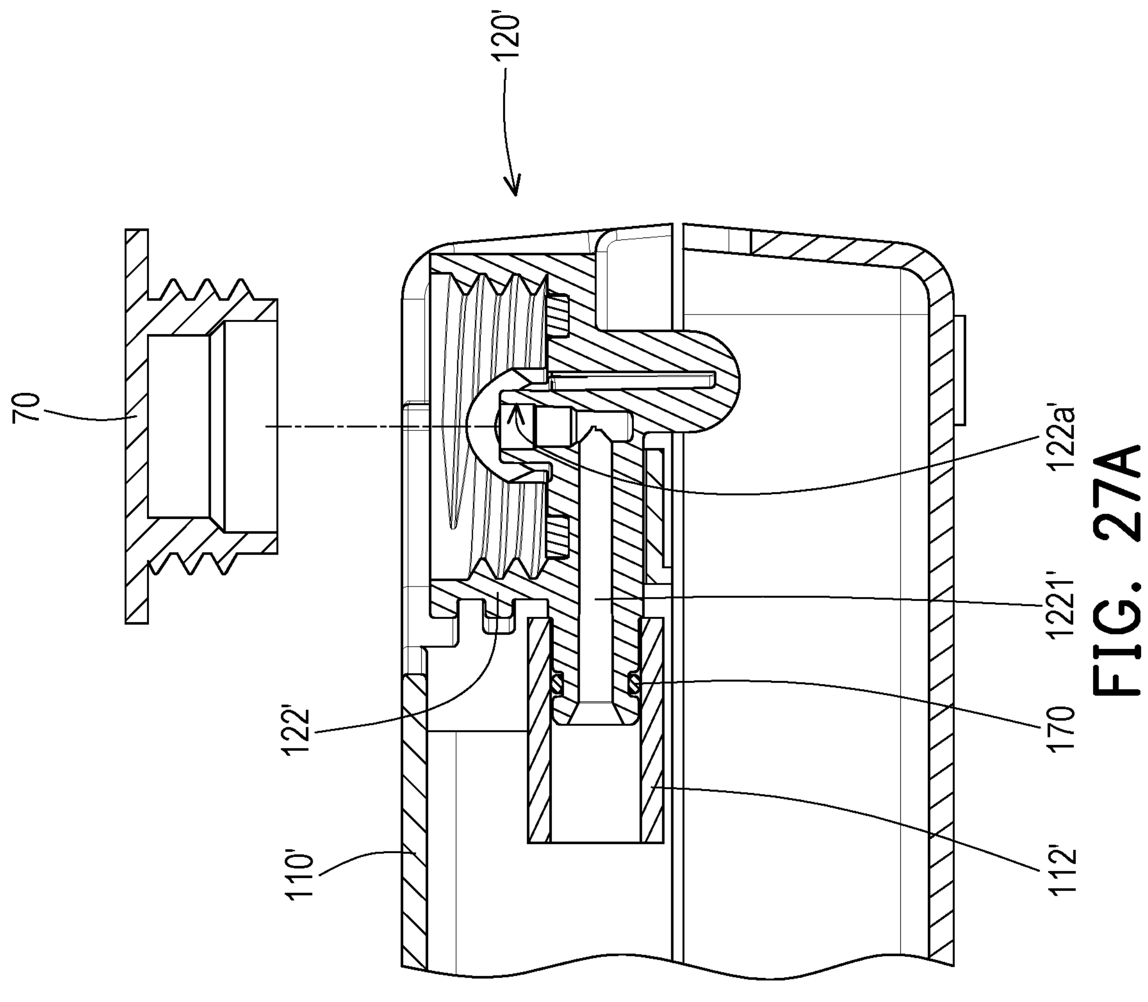
FIG. 27A illustrates the tire sealant containing bottle in FIG. 23D is replaced by a cover.
Figure 27B:
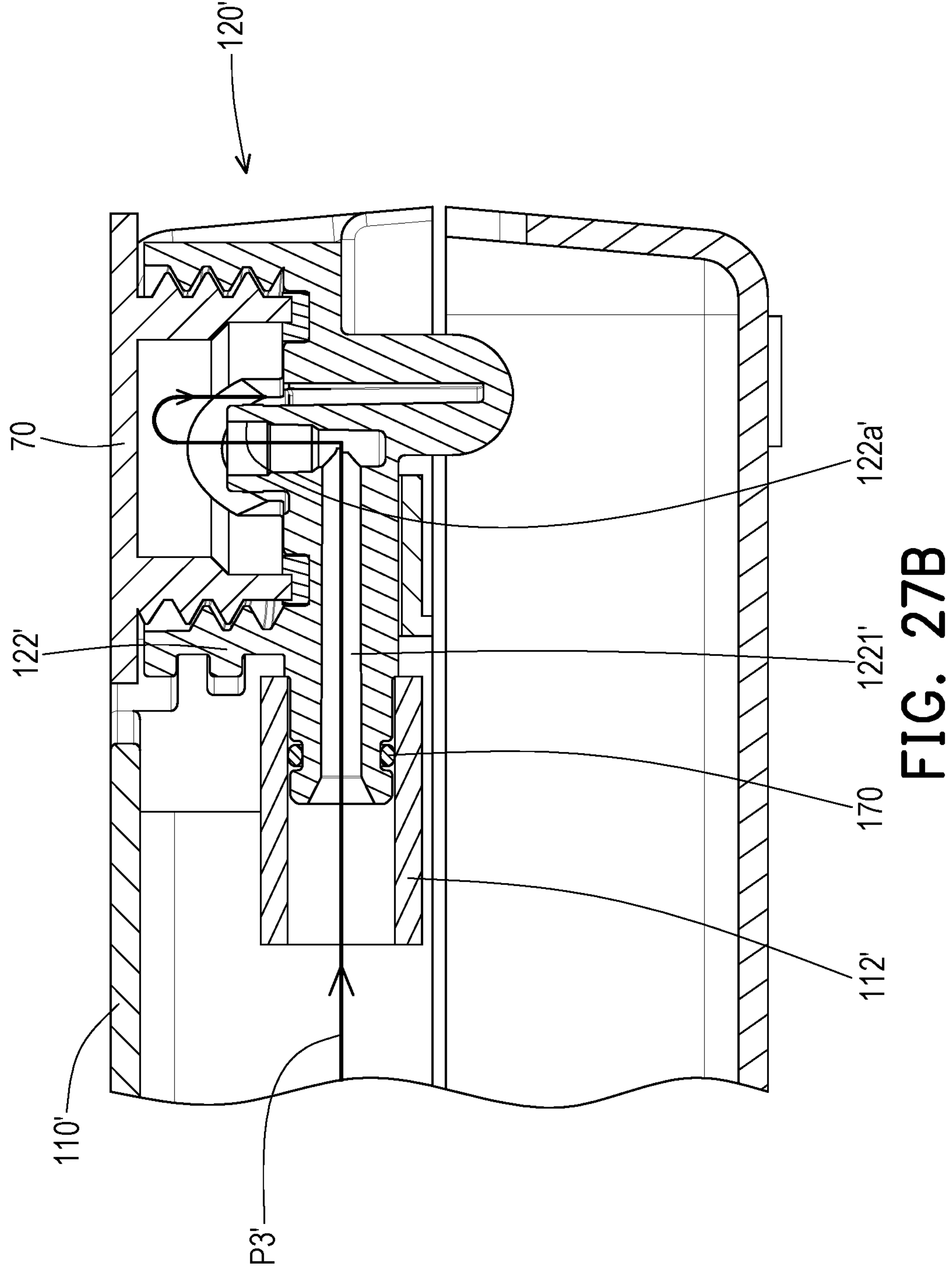
FIG. 27B illustrates the tire sealant containing bottle in FIG. 23E is replaced by a cover.

FIG. 25 illustrates the tire sealant containing bottle in FIG. 14 is replaced by a cover. FIG. 26 illustrates the tire sealant containing bottle in FIG. 15 is replaced by a cover. FIG. 27A illustrates the tire sealant containing bottle in FIG. 23D is replaced by a cover. FIG. 27B illustrates the tire sealant containing bottle in FIG. 23E is replaced by a cover. The vehicle-mounted air compressor 100' of this embodiment can only inflate the tire 60 without repairing the tire 60. Specifically, the tire sealant containing bottle 50 in FIG. 14, FIG. 15, FIG. 23D and FIG. 23E can be replaced by a cover 70 in FIG. 25, FIG. 26, FIG. 27A and FIG. 27B. The rest of the operation process is the same as above and will not be repeated here. Since the method shown in FIG. 25, FIG. 26, FIG. 27A and FIG. 27B does not use the tire sealant containing bottle 50, the high-pressure air flow from the air compressor main body 110' passes through the bottle cap assembly 120' and directly reaches the tire for inflation, as the flow path P3' shown in FIG. 27B.

In summary, the vehicle-mounted air compressor of the invention fastens the bottle cap component to the air compressor main body by fastening components, the user only needs to simply install the bottle cap to the air compressor main body and lock the fastening components for installing the bottle cap component, and the user only needs to simply remove the fastening components and then remove the bottle cap component for completing the disassembly of the bottle cap component and/or the replacement of the tire sealant containing bottle. Furthermore, by setting the fastening direction of the fastening components to be the same as the inserting direction of the air inlet end of the bottle cap component, the invention allows the user to sequentially install the bottle cap component and fasten the fastening components in a convenient and identical working direction. In addition, since the fastening direction of the fastening components is the same as the inserting direction of the air inlet end of the bottle cap component, the air inlet end can be firmly inserted to the air compressor main body by fastening the fastening components.

It will be apparent to those skilled in the art that various modifications and variations can be made to the disclosed embodiments without departing from the scope or spirit of the disclosure. In view of the foregoing, it is intended that the disclosure covers modifications and variations provided that they fall within the scope of the following claims and their equivalents.

What is claimed is:

1. An air compressor, comprising:

an air compressor main body; and a bottle cap assembly, comprising:

a bottle cap component, installed on the air compressor main body and has an air inlet end and an air outlet end connected to each other, wherein the bottle cap component is inserted into the air compressor main body through the air inlet end along an inserting direction, which is the same as an air inlet direction of the air inlet, an air flow from the air compressor main body is adapted to pass through the air inlet end and the air outlet end in sequence, and the bottle cap component has at least one assembling hole; and at least one fastening component, passing through the at least one assembling hole along a fastening direction to fasten the bottle cap component to the air compressor main body, wherein the fastening direction is the same as the inserting direction.

2. The air compressor according to claim 1, wherein the at least one assembling hole comprises two assembling holes, the two assembling holes are arranged along an arrangement direction to be located at two opposite sides of the bottle cap component respectively, and the arrangement direction is perpendicular to the fastening direction.

3. The air compressor according to claim 1, wherein the bottle cap component is adapted to be coupled with a tire sealant containing bottle along a coupling direction, and the arrangement direction is perpendicular to the coupling direction.

4. The air compressor according to claim 1, wherein the bottle cap component has at least one ear portion, and the at least one assembling hole is located on the at least one ear portion.

5. The air compressor according to claim 1, wherein the bottle cap component is adapted to be coupled with a bottle mouth of a tire sealant containing bottle, the bottle cap component has at least one cutting rib, and the at least one cutting rib is adapted to cut a sealing film on the bottle mouth of the tire sealant containing bottle.

6. The air compressor according to claim 1, wherein the air inlet direction of the air inlet end and an air outlet direction of the air outlet end are perpendicular to each other.

7. The air compressor according to claim 1, wherein the air inlet direction of the air inlet end and an air outlet direction of the air outlet end are parallel to each other.

8. The air compressor according to claim 1, wherein the air compressor main body has an accommodating concave portion and at least one locking hole, the bottle cap component is accommodated in the accommodating concave portion, the at least one locking hole is located in the accommodating concave portion, and the at least one fastening component is locked to the at least one locking hole.

9. The air compressor according to claim 8, wherein the accommodating concave portion has at least one inner wall perpendicular to the fastening direction, and the at least one locking hole is located on the at least one inner wall.

10. The air compressor according to claim 8, wherein the accommodating concave portion has an opening end, and a locking tool is adapted to reach the at least one locking hole through the opening end and locks the at least one fastening component to the at least one locking hole.

11. The air compressor according to claim 1, wherein the air compressor main body has an air outlet pipe, the air outlet pipe is connected to the air inlet end of the bottle cap component, a top surface of the air compressor main body has an opening, and an interconnection between the air outlet pipe and the air inlet end of the bottle cap component is corresponding to the opening.

12. A bottle cap assembly, adapted to an air compressor and comprising:

a bottle cap component, installed on an air compressor main body of the air compressor and has an air inlet end and an air outlet end connected to each other, wherein the bottle cap component is inserted into the air compressor main body through the air inlet end along an inserting direction, which is the same as an air inlet direction of the air inlet, an air flow from the air compressor main body is adapted to pass through the air inlet end and the air outlet end in sequence, and the bottle cap component has at least one assembling hole; and at least one fastening component, passing through the at least one assembling hole along a fastening direction to fasten the bottle cap component to the air compressor main body, wherein the fastening direction is the same as the inserting direction.

13. The bottle cap assembly according to claim 12, wherein the at least one assembling hole comprises two assembling holes, the two assembling holes are arranged along an arrangement direction to be located at two opposite sides of the bottle cap component respectively, and the arrangement direction is perpendicular to the fastening direction.

14. The bottle cap assembly according to claim 12, wherein the bottle cap component is adapted to be coupled with a tire sealant containing bottle along a coupling direction, and the arrangement direction is perpendicular to the coupling direction.

15. The bottle cap assembly according to claim 12, wherein the bottle cap component has at least one ear portion, and the at least one assembling hole is located on the at least one ear portion.

16. The bottle cap assembly according to claim 12, wherein the bottle cap component is adapted to be coupled with a bottle mouth of a tire sealant containing bottle, the bottle cap component has at least one cutting rib, and the at least one cutting rib is adapted to cut a sealing film on the bottle mouth of the tire sealant containing bottle.

17. The bottle cap assembly according to claim 12, wherein the air inlet direction of the air inlet end and an air outlet direction of the air outlet end are perpendicular to each other.

18. The bottle cap assembly according to claim 12, wherein the air inlet direction of the air inlet end and an air outlet direction of the air outlet end are parallel to each other.

* * * * *